United States Patent
Davidson

(10) Patent No.: US 9,443,407 B2
(45) Date of Patent: Sep. 13, 2016

(54) ELECTRONIC ARTICLE SURVEILLANCE USING RADIO FREQUENCY IDENTIFICATION

(71) Applicant: RFID Resolution Team, Inc., Sanford, NC (US)

(72) Inventor: William Edward Davidson, Durham, NC (US)

(73) Assignee: RFID RESOLUTION TEAM, INC., Sanford, NC (US)

( * ) Notice: Subject to any disclaimer, the term of this patent is extended or adjusted under 35 U.S.C. 154(b) by 30 days.

(21) Appl. No.: 14/408,330

(22) PCT Filed: Jun. 14, 2013

(86) PCT No.: PCT/US2013/045811
§ 371 (c)(1),
(2) Date: Dec. 16, 2014

(87) PCT Pub. No.: WO2013/192033
PCT Pub. Date: Dec. 27, 2013

(65) Prior Publication Data
US 2015/0194030 A1    Jul. 9, 2015

Related U.S. Application Data

(60) Provisional application No. 61/661,304, filed on Jun. 18, 2012.

(51) Int. Cl.
G08B 13/14    (2006.01)
G08B 13/24    (2006.01)
G06K 7/10    (2006.01)

(52) U.S. Cl.
CPC ....... *G08B 13/2468* (2013.01); *G06K 7/10356* (2013.01); *G08B 13/248* (2013.01); *G08B 13/2417* (2013.01); *G08B 13/2474* (2013.01)

(58) Field of Classification Search
CPC .... G08B 13/24; G08B 13/246; G08B 13/14; G08B 13/2417; G08B 13/2468; G08B 13/248; G06K 7/10297; G06K 7/10316; G01S 13/825; G01S 13/878
USPC ............. 340/572.1, 572.4, 572.7, 10.1, 10.4; 235/383, 385; 342/429, 445
See application file for complete search history.

(56) References Cited

U.S. PATENT DOCUMENTS

| | | | |
|---|---|---|---|
| 6,362,738 B1 | 3/2002 | Vega | |
| 7,359,672 B2 | 4/2008 | Lynch | |
| 7,527,198 B2 * | 5/2009 | Salim | G06K 17/0022 235/378 |
| 2006/0116899 A1 * | 6/2006 | Lax | G06Q 10/08 356/402 |
| 2006/0158316 A1 * | 7/2006 | Eckstein | G08B 13/2414 340/10.42 |
| 2008/0024276 A1 | 1/2008 | Volpi et al. | |
| 2009/0189768 A1 | 7/2009 | Copeland et al. | |
| 2011/0221572 A1 | 9/2011 | Wang et al. | |
| 2012/0044074 A1 * | 2/2012 | Mulla | G06Q 10/08 340/572.1 |
| 2013/0169413 A1 * | 7/2013 | Schuessler | G08B 13/2417 340/10.1 |

* cited by examiner

*Primary Examiner* — Hung T Nguyen
(74) *Attorney, Agent, or Firm* — Coats & Bennett, PLLC

(57) ABSTRACT

An Electronic Article Surveillance ("EAS") system is provided wherein the system is configured to detect passive radio frequency identification ("RFID") tags. The system can be configured to read the passive RFID tags and produce a corresponding emulated EAS signal to initiate an alarm on a detected tag. The system can transmit the emulated EAS signal to a legacy EAS system thereby utilizing an existing EAS infrastructure. In some embodiments, a composite EAS system is configured to detect RFID tags and other EAS tags, wherein the composite EAS system comprises a legacy EAS system and an RFID-based EAS system configured to produce an emulated EAS signal.

16 Claims, 13 Drawing Sheets

ELECTRONIC ARTICLE SURVEILLANCE USING RADIO FREQUENCY IDENTIFICATION

RELATED APPLICATIONS

This application claims the benefit of priority under 35 U.S.C. §119(e) of U.S. Provisional Patent Application No. 61/661,304, filed Jun. 18, 2012, entitled "ELECTRONIC ARTICLE SURVEILLANCE USING RADIO FREQUENCY IDENTIFICATION," the disclosure of which is hereby incorporated by reference in its entirety.

BACKGROUND

1. Field

The disclosure relates generally to electronic article surveillance, and more particularly to electronic article surveillance systems using RFID tags.

2. Description of the Related Art

Loss prevention often focuses on perimeter or exit solutions designed to detect attempts to remove items from a store that have not been processed through a point of sale ("POS") station. These solutions are collectively known as Electronic Article Surveillance ("EAS"). EAS systems can be used to detect tagged items as they pass through an interrogation field, such as an exit or corralled area within a store.

SUMMARY

The systems, methods and devices of the disclosure each have innovative aspects, no single one of which is indispensable or solely responsible for the desirable attributes disclosed herein. Some of the advantageous features of some embodiments will now be summarized.

An Electronic Article Surveillance ("EAS") system is provided wherein the system is configured to detect passive radio frequency identification ("RFID") tags. The system can be configured to read the passive RFID tags and produce a corresponding emulated EAS signal to initiate an alarm on a detected tag. The system can transmit the emulated EAS signal to a legacy EAS system thereby utilizing an existing EAS infrastructure. In some embodiments, a composite EAS system is configured to detect RFID tags and other EAS tags, wherein the composite EAS system comprises a legacy EAS system and an RFID-based EAS system configured to produce an emulated EAS signal.

Some embodiments provide for an EAS system configured to detect RFID tags associated with items in a store and associated with security personnel. The system can include one or more antennas and readers configured to interrogate RFID tags. The system can include an alarm controller configured to process information from the RFID tags such as the location or range to a detected RFID tag. Using the processed information, the system can determine which security personnel are proximate to an EAS gate and notify the proximate personnel and/or additional security personnel of a triggered alarm. In some embodiments, the security personnel can have security equipment that can receive information from the system about the items triggering the alarm. In certain embodiments, the security equipment can enter a search mode when notified of the triggered alarm such that the security personnel can use the security equipment to localize the items triggering the alarm.

Some embodiments provide for an EAS system configured to detect passive RFID tags utilizing one or more EAS gates. The system can include a centralized reader and control system having a multi-port RFID reader and an electronic article surveillance manager. The system can include a coaxial cable having a first end and a second end, the first end coupled to a first port in the multi-port RFID reader and the second end coupled to a first EAS gate. The first EAS gate includes a gate alarm controller, I/O module, radio module, power splitter, and one or more antennas coupled to the power splitter. The EAS system is configured to operate with passive RFID tags having a frequency between about 800 MHz and about 1 GHz. In some embodiments, the EAS system emulates an EAS signal of another system in some regards.

In a first aspect, an electronic article surveillance system ("EAS") is provided. The EAS system is configured to detect radio frequency identification ("RFID") tags and transmit an EAS tag signal. The EAS system includes one or more RFID antennas configured to transmit and receive ultra-high frequency ("UHF") signals. The EAS system includes an RFID reader coupled to the one or more RFID antennas, wherein the RFID reader is configured to interrogate RFID tags. The EAS system includes an EAS conversion module coupled to the RFID reader, the EAS conversion module configured to receive information about interrogated RFID tags from the RFID reader and generate an EAS tag signal based on the received information. The EAS system includes an EAS transmission module coupled to the EAS conversion module, the EAS transmission module configured to transmit the generated EAS tag signal using one or more EAS antennas.

In some implementations of the first aspect, the EAS conversion module is configured to generate an acousto-magnetic EAS tag signal.

In some implementations of the first aspect, the EAS conversion module is configured to generate a radio-frequency EAS tag signal.

In some implementations of the first aspect, the EAS system further includes an EAS alarm module configured to provide false alarm avoidance filters. In a further implementation, the false alarm avoidance filters are based on at least one of an identification, position, or velocity of an RFID tag. In a further implementation, the false alarm avoidance filters correspond to a degree of certainty that an article is passing through a monitored zone.

In some implementations of the first aspect, the RFID reader is configured to interrogate RFID tags using electromagnetic signals having a frequency between about 430 MHz and about 440 MHz.

In a second aspect, a method of locating an item using an Electronic Article Surveillance ("EAS") system is provided. The method includes detecting a presence of an RFID-based EAS tag at an EAS gate. The method includes identifying information associated with the detected RFID-based EAS tag. The method includes identifying security personnel within a range of the EAS gate. The method includes sending the information associated with the detected RFID-based EAS tag to a security equipment associated with the identified security personnel. The method includes commanding the security equipment to enter into a search mode. The security equipment is configured to indicate a position or range to the detected RFID-based EAS tag.

In some implementations of the second aspect, the information associated with the detected RFID-based EAS tag includes a tag identification ("TID"), an object identification ("OID"), antenna information, EAS gate information, channel number, transmission power, frequency, RSSI value, date of detection, time of detection, phase angle, or number of reads.

In some implementations of the second aspect, identifying security personnel includes interrogating RFID-based tags, selecting an RFID-based tag associated with security equipment, and determining a location of the RFID-based tag associated with security equipment.

In some implementations of the second aspect, the method includes providing a false alarm filter based at least in part on the information associated with the detected RFID-based EAS tag. In a further implementation, the method includes preventing sending the information associated with the detected RFID-based EAS tag to the security equipment associated with the identified security personnel when the provided false alarm filter indicates a false alarm condition. In a further implementation, the method includes preventing commanding the security equipment to enter the search mode when the provided false alarm filter indicates a false alarm condition.

In a third aspect, an electronic article surveillance ("EAS") system is provided that is configured to detect passive radio frequency identification (RFID) tags. The EAS system includes a centralized reader and control system comprising a multi-port RFID reader, an electronic article surveillance manager, and a first reader signal management module coupled to a first port of the multi-port RFID reader. The EAS system includes a first electronic article surveillance gate comprising a gate signal management module coupled to a cable, a gate alarm controller coupled to the gate signal management module, an I/O module coupled to the gate alarm controller, a radio module coupled to the gate alarm controller, a power splitter coupled to the signal management module, and one or more antennas coupled to the power splitter. The cable electrically couples the gate signal management module to the first reader signal management module. The first electronic article surveillance gate is configured to detect the presence of passive RFID tags responding to an electromagnetic signal having a frequency between about 800 MHz and about 1 GHz.

In some implementations of the third aspect, the first electronic article surveillance gate further comprises an emulation module configured to emulate an electronic article surveillance tag signal. In a further implementation, the emulation module is configured to emulate an acousto-magnetic electronic article surveillance tag signal. In a further implementation, the emulation module is configured to emulate a radio frequency electronic article surveillance tag signal.

In some implementations of the third aspect, the electronic article surveillance manager is configured to provide false alarm avoidance filters. In a further embodiment, the false alarm avoidance filters are based on at least one of an identification, position, or velocity of an electronic article surveillance tag. In a further embodiment, the false alarm avoidance filters correspond to a degree of certainty that an article is passing through a monitored zone.

In some implementations of the third aspect, the centralized reader and control system is configured to communicate with a store management system. In some implementations of the third aspect, the centralized reader and control system is configured to communicate with a point-of-sale system. In some implementations of the third aspect, the radio module of the first electronic article surveillance gate is configured to transmit electromagnetic signals having a frequency between about 430 MHz and about 440 MHz.

In some implementations of the third aspect, the first electronic article surveillance gate is configured to detect the presence of security personnel. In some implementations of the third aspect, the first electronic article surveillance gate is configured to detect the presence of security equipment.

In some implementations of the third aspect, the EAS system further includes a deactivator system configured to deactivate an electronic article surveillance tag. In a further implementation, the deactivator system comprises a system that removes the electronic article surveillance tag. In a further implementation, the deactivator system comprises a system that writes a defined code to the electronic article surveillance tag. In a further implementation, the deactivator system deactivates a proximate electronic article surveillance tag through a change in capacitance of the proximate electronic article surveillance tag.

In some implementations of the third aspect, the electronic article surveillance manager is configured to distinguish between stationary and moving tags.

In some implementations of the third aspect, the EAS system further includes a second electronic article surveillance gate coupled to a second cable, the second cable coupled to a second reader signal management module, the second reader signal management module coupled to a second port of the multi-port RFID reader. The second electronic article surveillance gate includes a second gate signal management module coupled to the second coaxial cable, a second gate alarm controller coupled to the second gate signal management module, a second I/O module coupled to the second gate alarm controller, a second radio module coupled to the gate alarm controller, a second power splitter coupled to the second gate signal management module, and one or more second antennas coupled to the second power splitter.

In some implementations of the third aspect, the first reader signal management module or the gate signal management module comprises a DC block with bias tee.

In some implementations of the third aspect, the second reader signal management module or the second gate signal management module comprises a DC block with bias tee.

In some implementations of the third aspect, the cable comprises a coaxial cable.

In a fourth aspect, a method of generating an alarm using an Electronic Article Surveillance ("EAS") system is provided where the EAS system includes a centralized reader and control system, one or more EAS gates electrically or wirelessly coupled to one or more ports on a multi-port radio frequency identification ("RFID") reader. The method includes selecting a port on the multi-port RFID reader corresponding to a defined EAS gate. The method includes detecting a presence of an EAS tag at the defined EAS gate. The method includes, determining whether the EAS tag is active. The method includes applying a false alarm avoidance filter. The method includes determining whether to trigger an alarm. The method includes triggering an alarm based on the determination of whether to trigger the alarm.

In some implementations of the fourth aspect, determining whether the EAS tag is active include identifying the EAS tag and comparing information from the EAS tag to a list of active EAS tags.

In some implementations of the fourth aspect, applying the false alarm avoidance filter includes identifying the EAS tag, determining a position of the EAS tag, determining a velocity of the EAS tag, and calculating a figure of merit corresponding to a degree of certainty that the EAS tag is moving through a monitored zone. In a further aspect, determining whether to trigger the alarm includes comparing the figure of merit to a sensitivity setting at the defined EAS gate, wherein the sensitivity setting corresponds to a range of values of the figure or merit that trigger an alarm, and providing a positive indication of an alarm status if the figure of merit falls within the range of values in the sensitivity setting at the defined EAS gate.

BRIEF DESCRIPTION OF THE DRAWINGS

The drawings are provided to illustrate example embodiments described herein and are not intended to limit the scope of the disclosure. Throughout the drawings, reference numbers may be re-used to indicate general correspondence between referenced elements.

DETAILED DESCRIPTION

Figure 1:
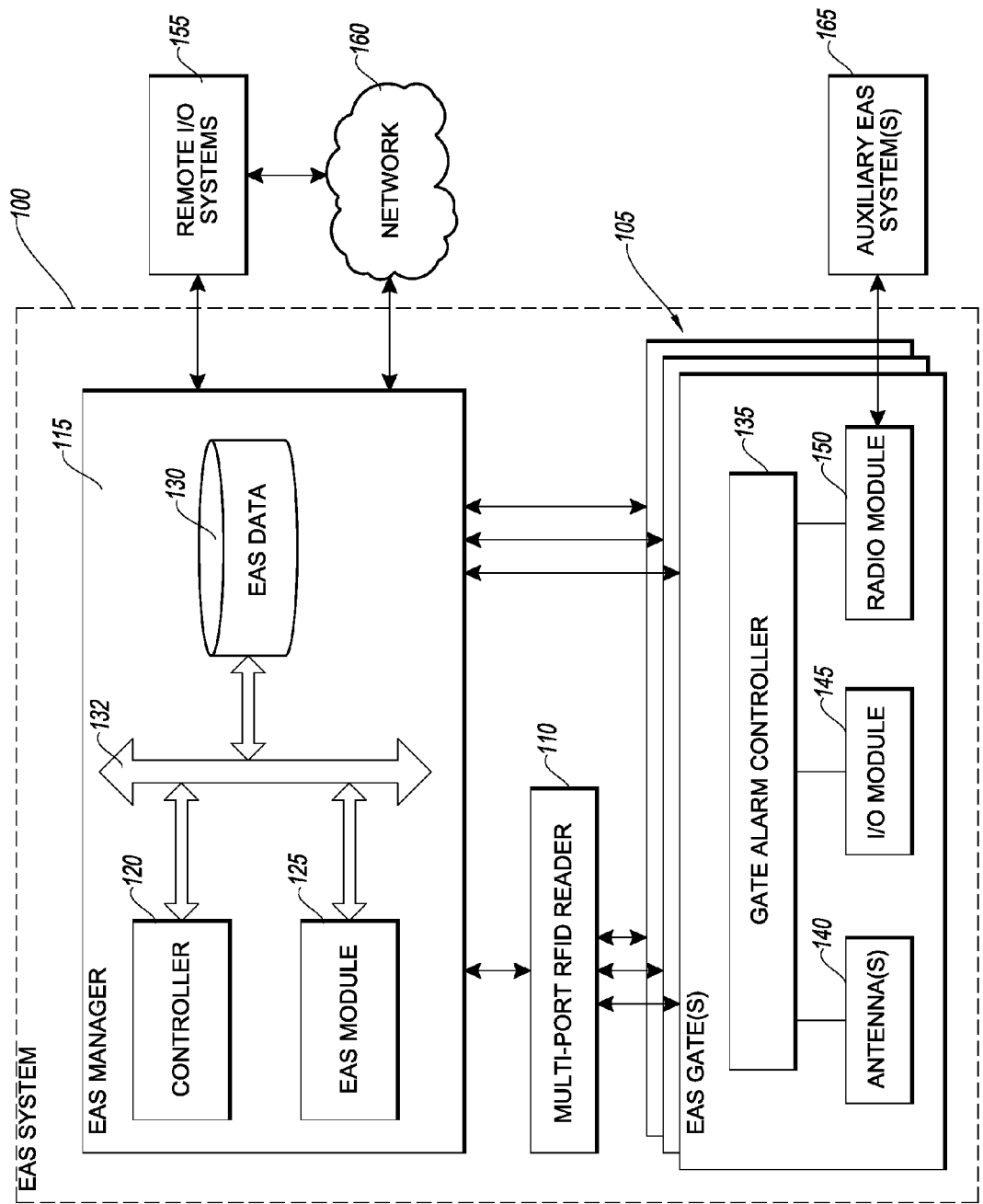
FIG. 1 shows a block diagram of some embodiments of an Electronic Article Surveillance ("EAS") system.

Various aspects of the disclosure will now be described with regard to certain examples and embodiments, which are intended to illustrate but not to limit the disclosure. Nothing in this disclosure is intended to imply that any particular feature or characteristic of the disclosed embodiments is essential. The scope of protection of certain inventions is defined by the claims. For ease of reference, the description below uses the term "store" in discussing the EAS system.

The term "store" can refer to any type of area where products are stored, sold and monitored for loss prevention or removal of items, including but not limited to retail facilities, supermarkets, warehouses, secure facilities, libraries, evidence rooms, document archives, etc.

Several types of EAS technology can be used in stores, such as Acousto-Magnetic ("AM") or Radio Frequency ("RF") based EAS systems. RF-EAS systems can interrogate tags using an electromagnetic signal having a frequency that typically ranges from about 8.2 MHz to about 13.56 MHz. In some embodiments, AM-EAS systems can use transmitters to send electromagnetic signals having a frequency of about 58 kHz. Some tags used in conjunction with RF-EAS and AM-EAS systems can carry one bit of information and respond to an interrogation with a 1 or 0. In some embodiments, the interrogation field can be configured to detect the presence of a tag in the field, query the tag, and trigger an alarm if it discovers a tag that has not been properly removed or deactivated. In some embodiments, these systems may not provide information about what type of item caused the alarm or how many items were detected.

EAS systems and tags are typically used to prevent theft in a retail environment, but can be used to monitor other types of items in other environments. EAS systems typically operate by creating an interrogation field using EAS detection systems that include antennas used to emit and detect defined signals. A typical use is to position an interrogation field at perimeter foot traffic chokepoints, such as a main entrance/exit or corralled areas within a store (such as a CD or DVD section within a larger retail store), and to detect tags passing through these chokepoints that have not been either deactivated or physically or virtually removed at the point of sale when the item was purchased.

EAS systems can be configured to detect the presence of EAS tags. Examples of EAS tags include, without limitation, inductive EAS tags, backscatter or microwave tags, frequency divider tags, electromagnetic tags, acousto-magnetic tags, RF EAS tags, and RFID-based EAS tags. EAS tags can have electromagnetic and physical properties used to deter theft, monitor items, track inventory, and the like. For example, to deter theft stores can tag products with EAS tags or labels that can be difficult to remove without a proper tool (e.g., hard tags). Some EAS tags are designed to damage an item if removed incorrectly and so discourage theft, or so-called benefit denial tags. EAS tags can also be inconspicuous or hidden to provide unobtrusive item monitoring and/or tracking. EAS tags based on RFID technology can provide traditional EAS capabilities in addition to being detectable over a larger range, providing more information about the tag and/or item being monitored, the number of items causing the alarm, and reducing costs.

An RF-EAS system is based on an EAS technology that sends signals at frequencies between about 8.2 MHz and 13.56 MHz, with the ability to distinguish multiple (e.g., two) return frequencies. The tags are deactivated or removed (in the case of a hard tag) at a point of sale and are not typically reusable after deactivation. The tags carry a single bit of information, and the EAS interrogation field simply detects the presence of a tag or tags in the field. Another common EAS system, an AM-EAS system, is based on an EAS technology that uses a transmitter to send signals at frequencies of about 58 kHz. The tags have the capacity to be turned on and off multiple times and are typically deactivated (or removed in the case of a hard tag) at a point of sale. Similar to the RF-EAS system described above, the tags carry a single bit of information, and the EAS interrogation field simply detects the presence of a tag in the field.

These tags are often called '1-bit' tags because they are capable of communicating 1 bit of information. One bit may be used to store the answer to a yes or no question. For example, the question can be, 'Are there one or more tags present?' If at least one tag is detected, the answer is '1' or 'yes.' If a tag is not present, the answer is '0' or 'no.'

EAS systems can be configured to use UHF RFID technology instead of or in addition to other EAS technologies. UHF RFID systems typically send signals at frequencies between about 800 MHz and about 1 GHz. UHF RFID tags can be two-dimensional, carry multiple bits of information, and store information that can be changed multiple times. RFID tags can be active, passive, or battery-assisted passive RFID tags. The tags can include an integrated circuit and an antenna. The integrated circuit on a tag can be configured to modulate and demodulate a signal from an EAS system; store information such as tag identification, object identification, stock number, batch number, or the like; and/or collect the transmitted power from the antenna to assist in transmitting a response to an interrogation by an RFID reader. The tags can be configured to operate in low-frequency (LF) band (e.g., having a frequency between about 128 and about 134 kHz), high-frequency (HF) band (e.g., having a frequency of about 13.56 MHz), ultra-high-frequency (UHF) band, or other RFID frequency band, such as microwave band having a frequency of about 2.45 GHz. For example, a passive RFID tag can be configured to send and receive UHF signals having a frequency of at least about 902 MHz and/or less than or equal to about 928 MHz, or a frequency of at least about 865 MHz and/or less than or equal to about 870 MHz.

Certain EAS systems, such as RF-EAS and AM-EAS systems, may have limitations due to the one bit of information stored in the tags which may result in an inability to distinguish individual EAS tags as they pass through an interrogation field (e.g., a door customers use to exit a store). As a result, the EAS system cannot determine which tagged items or how many items are passing through the interrogation field in an active state. In some embodiments, EAS systems employing UHF RFID technology can be configured to overcome these shortcomings. In some embodiments, including those with UHF RFID tags that can be individually identifiable, EAS systems can leverage this information to add functionality such as tracking or monitoring items, identifying which items pass through an interrogation field, checking items detected at an interrogation field against point of sale data, providing false alarm avoidance filters, and the like. In addition, UHF RFID tags are becoming widely used on items for inventory purposes and employing EAS systems that use these same tags can reduce costs, eliminating the need to put separate tags on items and the need for separate interrogation systems for inventory and EAS functionalities.

Furthermore, some UHF RFID-based EAS can offer higher performance, greater functionality, and reduced costs when compared to some other types of EAS systems. For example, UHF RFID can offer longer detection ranges for EAS tags, such as greater than or equal to about 3 ft., greater than or equal to about 6 ft., greater than or equal to about 10 ft., greater than or equal to about 20 ft., greater than or equal to about 30 ft., greater than or equal to about 50 ft., or greater than or equal to about 100 ft. As a result, doorways, chokepoints, corralled areas, and the like can be protected using interrogation fields produced by EAS gates that are spaced far apart (e.g., 6 ft., 10 ft., 20 ft., 30 ft.) to reduce impediments to customers, reduce the total number of EAS gates, and increase the aesthetic appeal of the store. In some embodiments, the EAS system can include EAS gates that are hidden from plain view or have a low profile by installing the EAS gates in the floor, wall, ceiling, around doors, within other similar structures, or any combination of these.

As another example, some embodiments, including those with UHF RFID-based EAS, can provide greater functionality by providing more information about tags that trigger the EAS system. With some EAS systems, sufficient information is provided to determine whether one or more items have gone through an EAS gate. Using RFID tags allows for greater information to be provided because each RFID tag can have a unique identifier such that the EAS system can provide sufficient information to determine the number of items causing the alarm and what items are triggering the alarm if the information is tied to a product description. In some embodiments, the EAS system can be configured to communicate with a store management system to interface with inventory data and point of sale information. In some embodiments, the EAS system can provide additional checking against certain types of loss caused by employees (e.g., offering products at reduced rates without authorization), can generate reports on loss patterns, and can update inventory counts.

As another example, some embodiments, including those with UHF RFID-based EAS systems, can reduce costs associated with installing, running, and maintaining an EAS system. Being able to utilize the EAS function on existing RFID tags that have been installed on items for other reasons such as, for example, logistics, inventory, or automated point-of-sale, saves the cost of installing a second tag dedicated to EAS functionality. Another benefit is that an RFID-based EAS system can be used for multiple functions such that the return on investment can affect a number of different areas. This is true of both the tags and the reader equipment.

As another example, some embodiments, including those with UFH RFID-based EAS systems, can be configured to provide false alarm avoidance filters. A typical problem faced by retailers is balancing loss prevention with efficient utilization of floor space. The area around the entrance and exits to the store is desirable retailing space because it is a prime display area to draw customers in the store. Retail floor space is expensive so the store wants to have merchandise located close to the store entrances to attract customers in plus they cannot afford to lose potential space for selling product. One problem with traditional EAS is that a store cannot display merchandise close to EAS gates or portals as those items will be read by the system and cause false alarms. For some embodiments, this problem can be compounded due to the increased range of detection associated with these systems. In some embodiments, the EAS systems described herein provide false alarm avoidance filters utilizing the information provided by RFID tags. These filters can allow stores to display merchandise in the valuable retail space close to the entrance areas that are being protected.

Overview of EAS Systems

FIG. 1 shows a block diagram of some embodiments of an Electronic Article Surveillance ("EAS") system 100. The EAS system 100 can be used to monitor RFID tags associated with items by establishing monitored zones in a store. The locations and sizes of the monitored zones can be defined by one or more EAS gates 105 which create one or more interrogation fields. When an RFID tag enters, exits, or passes through a monitored zone, the EAS system 100 can be configured to, for example, generate an alarm, alert store systems or personnel, notify remote systems or personnel, update a store management system, check information received from the RFID tag against point-of-sale information, compare information received from the RFID tag to inventory information, or the like. In this way, the EAS system 100 can be used to aid in the prevention of theft in a retail environment and to monitor items in other environments.

The EAS system 100 can include one or more EAS gates 105 coupled to a multi-port RFID reader 110 and EAS manager 115. Components of the EAS system 100 can communicate over a network, direct link (e.g., wired or wireless), or other communications link. In addition, the EAS system 100 can be connected to remote systems 155 via a network 160 or other communications link and to auxiliary EAS systems 165 through a wireless communications link. In some embodiments, when an active RFID tag comes within a suitable range of one or more of the EAS gates 105, the EAS system 100 can, for example, trigger an alarm to alert store personnel, security guards, police, or the like such that appropriate action is taken to prevent loss. In some embodiments, the EAS system 100 can track or monitor items that come within a suitable rage of the EAS gates 105 and create, for example, inventory reports, status updates, e-mail or text message notifications, or the like.

The one or more EAS gates 105 in the EAS system 100 can be configured to establish monitored zones within a desired area and/or at desired locations. Each EAS gate 105 can include a gate alarm controller 135 configured to control EAS gate components, one or more antennas 140 configured to interrogate RFID tags, an I/O module 145 for sending and receiving information, and a radio module 150 for communicating wirelessly with auxiliary EAS systems 165.

Each EAS gate 105 can include a gate alarm controller 135 configured to control signaling to the one or more antennas 140, the I/O module 145, and/or the radio module 150. The gate alarm controller 135 can be implemented in hardware, software, firmware, or any combination of these. For example, the gate alarm controller 135 can include logical elements configured to direct signals to the antennas 140 for interrogating RFID tags. As another example, the gate alarm controller 135 can include control modules configured to make decisions based on information received from various components within the EAS system 100. As another example, the gate alarm controller 135 can include one or more processors configured to process information from the RFID reader 110 or the EAS manager 115 to send to the antennas 140, the I/O module 145, or the radio module 150. As used herein, the term "processor" refers broadly to any suitable device, logical block, module, circuit, or combination of elements for executing instructions. The gate alarm controller 135 can be any conventional general purpose single- or multi-chip microprocessor such as a Pentium® processor, a MIPS® processor, a Power PC® processor, AMD® processor, ARM® processor, or an ALPHA® processor. In addition, the gate alarm controller 135 can be any conventional special purpose microprocessor such as a digital signal processor. The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. The gate alarm controller 135 can also be implemented as a combination of computing devices, e.g., a combination of a DSP and a microprocessor, a plurality of microprocessors, one or more microprocessors in conjunction with a DSP core, or any other such configuration.

In some embodiments, the antennas 140 in an EAS gate 105 are coupled to a single port of the multi-port RFID reader 110 through the gate alarm controller 135. The antennas 140 can be steerable, extendable, omni-directional, directional, isotropic, or some other configuration. The antennas 140 can comprise a single antenna element, a linear phased-array of antenna elements, or a matrix of antenna elements. The antennas 140 can be, but not limited to, patch antennas, a phased array, a bi-directional phased array, dipoles, near field, or any combination of these. Steerable or extendable antennas may help in providing directional information related to detected tags, permitting a general determination of tag location based on phase angle, received signal strength indicator value, and/or detected angle from the antenna, as more fully set forth herein.

The EAS system 100 can be configured to interrogate RFID tags through the EAS gates 105 and associated antennas 140. In some embodiments, the EAS gates 105 can interrogate ultra-high frequency ("UHF") passive RFID tags that conform to industry standards such as, for example, EPC Gen-2 tags and ISO-18000-6C tags. In some embodiments, the RFID tag is a passive RFID tag that reflects the carrier signal back to a transmitting antenna 140. The passive RFID tag can be configured to be responsive to signals broadcast having a frequency greater than or equal to about 800 MHz and/or less than or equal to about 1 GHz, greater than or equal to about 902 MHz and/or less than or equal to about 928 MHz, or greater than or equal to about 865 MHz and/or less than or equal to about 870 MHz. The RFID components of the tags can be incorporated into, for example, reusable tags, hard tags, labels, single-use tags or labels, other tags or labels, or the like. In some embodiments, the EAS system 100 can operate with EPC Gen-2 extension tags which have an EAS bit in the electronic code of the tag such as EPC Gen-2 item-level tags provided by NXP Semiconductors. In some embodiments, the EAS system 100 interrogates RFID tags that have a common Object ID ("OID") code for all tags (e.g., in a family of tags, such as items belonging to a particular store) then distinguishes among tags through the Tag ID ("TID"), where the TID is an electronic code corresponding to a unique serial number typically encoded by the tag manufacturer. For example, the EAS system 100 can distinguish among items or products through the use of a database or other reference that maps the TID of a tag to the item or product associated with the tag. In some embodiments, the EAS system 100 interrogates RFID tags that use the OID to identify an associated item and whether the associated item has been sold, where the OID corresponds to a changeable electronic code that is included on at least EPC Gen-2 tags. For example, the OID can be changed through the application of an appropriate electronic signal such that the OID can be used to store a Universal Product Code ("UPC") or other similar information that identifies an item and includes information indicating whether that item has been sold. In some embodiments, the EAS system 100 can be configured to interrogate EPC Gen-2 extension RFID tags, RFID tags with TIDs, and RFID tags with OIDs.

The range of the interrogating hardware in the EAS gates 105 can define a monitored zone around and/or near the EAS gates 105. For example, the monitored zone can be approximately defined by a directionality, power, and radiation pattern of the combination of antennas 140 in the EAS gates 105. In some embodiments, the zone of an EAS gate 105 can extend less than or equal to about 50 feet from the gate, less than or equal to about 30 feet from the gate, less than or equal to about 20 feet from the gate, less than or equal to about 10 feet from the gate, or less than or equal to about 6 feet from the gate. In some embodiments, the zone of an EAS gate 102 can extend greater than or equal to about 3 feet from the gate, greater than or equal to about 6 feet from the gate, greater than or equal to about 10 feet from the gate, greater than or equal to about 20 feet from the gate, greater than or equal to about 30 feet from the gate, or greater than or equal to about 50 feet from the gate. The combination of the relatively large range of the antennas 140 in the EAS gates 105 and the single multi-port RFID reader 110 allows the EAS system 100 to not require multiple narrow-beam, high-gain antennas activated one at a time to achieve a coverage range in a specified region.

The EAS gates 105 can include an I/O module 145 for controlling EAS elements such as, for example, status lights, annunciators, security cameras, sirens, speakers, and the like. For example, a customer can carry an activated RFID tag into a monitored zone of the EAS system 100. In this example, the EAS gate 105 can, through the I/O module 145, cause a light to turn on indicating an active tag in a monitored zone, trigger a security camera to point in a defined direction and/or begin recording, generate a sound or series of sounds, or the like. In some embodiments, the I/O module includes one or a plurality (e.g., two, three, four, five, or more than five) of digital outputs configured to interface with physical alarm elements. The I/O module 145 can be configured to receive data such as input from sensors. For example, the I/O module 145 can receive information from infrared or motion sensors to indicate that a person is moving within the monitored zone of the EAS gate 105 and to suppress an alarm response and/or alert security systems or personnel of the presence of a person in the monitored zone. The I/O module 145 can receive information from input sensors configured to indicate whether a person is crossing a threshold, such as a door, and/or whether the person is entering or exiting the threshold. In some embodiments, the system 100 can incorporate alarm rules that utilize information from input sensors. For example, the system 100 can be configured to alarm when a tag is exiting a monitored zone or exiting the store. The system 100 can be configured to turn on or off an EAS functionality based on the proximity of a person, such as turning on when a person is approaching or is in range of an EAS gate 105, thereby reducing or eliminating interference with other RFID functionality. In some embodiments, the system 100 compiles and reports statistics provided by input sensors. For example, the system 100 can report a number of people entering and/or exiting the store and the times associated with these entrances and/or exits. In some embodiments, the I/O module 145 is coupled directly to the EAS manager 115. In certain embodiments, the I/O module 145 is separate from the EAS gates 105.

The EAS gates 105 can include a radio module 150 configured to transmit and receive wireless signals from auxiliary EAS systems 165. The radio module 150 can include hardware and software components forming a wireless communication system, such as, for example, a radio frequency ("RF") communication system, ultra-wide band communication system, Bluetooth communication system, or any combination of these. In some embodiments, the radio module 150 comprises at least one antenna configured to transmit and receive RF signals having a frequency at least about 310 MHz and/or less than or equal to about 320 MHz, between about 430 MHz and about 440 MHz, and/or between about 2.4 GHz and about 2.5 GHz. Advantageously, communication utilizing frequencies between about 310 MHz and 320 MHz (e.g., 315 MHz) and/or between about 430 MHz and 440 MHz (e.g., 433 MHz) can provide wireless communication that substantially does not interfere with conventional wireless technologies potentially present in the store, such as wireless networking systems, or with cellular communication systems, such as smartphones. Another advantage of the frequency range between about 430 MHz and 440 MHz (e.g., about 433 MHz) is that it is a common unlicensed band worldwide. In some embodiments, the radio module 150 is configured to communicate using a proprietary communication protocol. In some embodiments, the radio module 150 communicates wirelessly over standard frequency bands with standard protocols such as, for example, the IEEE 802.11 standard, including IEEE 802.11(a), (b), (g), or (n). In some embodiments, the antenna 1302 transmits and receives RF signals according to BLUETOOTH™ Specification Version 3.0+HS adopted in 2009. In some implementations the antenna 1302 transmits and receives CDMA, GSM, AMPS or other known signals that are used to communicate within a wireless cell phone network. The radio module 150 can include components such as transceivers, antennas, processors, controllers, memory, encoding engines, and the like. The radio module 150 can be configured to communicate with auxiliary EAS systems 165 that are within a designated range, such as, for example, about 300 ft., 50 ft., 20 ft., 10 ft., 10 m, 5 m, 2 m, within arm's reach, within line of sight, etc. Examples of auxiliary EAS systems 165 include, without limitation, sensors as described above, handheld RFID readers, security wands, alarm panels, remote alarming systems, communication devices associated with security personnel, and the like.

The EAS gates 105 can be coupled to a multi-port RFID reader 110 for controlling antennas 140 and processing signals received from interrogated RFID tags. The RFID reader 110 can be a multi-port RFID reader wherein a single port is coupled to a single EAS gate 105. In some embodiments, a single port of the multi-port RFID reader 110 is configured to control one or more antennas 140 in a designated EAS gate 105. This design configuration, wherein a single multi-port RFID reader 110 handles a plurality of EAS gates 105, can reduce costs and reduce interference when operating multiple RFID-based EAS gates simultaneously. In some embodiments, the RFID reader can be a high-sensitivity RFID reader configured to report phase angle, received signal strength, and/or phase shift, such as a Sirit IN610 reader or an Impinj Revolution reader. The RFID reader 110 can include a RF transceiver and can be coupled to one or more antennas 140 through the gate alarm controller 135 in the coupled EAS gate 105. The RFID reader 110 can send signals to and receive signals from the coupled antennas 140 through a suitable coupling element, such as a multiplexor, power splitter, or the like. The antennas 140 can transmit signals to and receive signals from RFID tags. The RFID reader 110 can be configured to interpret the signals received by the antennas 140 from the RFID tags to resolve tag information.

The EAS system 100 can include an EAS manager 115 operably coupled to the multi-port RFID reader 110 and the one or more EAS gates 105. The EAS manager 115 can include one or more controllers 120, an EAS module 125 for performing EAS operations, and data storage 130 for storing EAS data. For example, the EAS module 125 can be configured to analyze information received from the RFID reader 110 or information stored in data storage 130 to calculate a position of one or more items, calculate motion for one or more items, compare tag identifications against a list of sold or deactivated items, provide false alarm avoidance filters, provide tag monitoring, generate an alarm signal, indicate a list of items passing through an EAS gate, differentiate between moving and stationary items, and/or other related EAS functions. Data storage 130 can be configured to store information read by the RFID reader 110 for analysis, information received from remote I/O systems 155, information received from auxiliary EAS systems 165, system information, calibration information, or any combination of these. Similar to the gate alarm controller 135 described herein, the controller 120 can be implemented in hardware, software, firmware, or any combination of these. For example, the controller 120 can include one or more processors. The components can be connected via a communications medium 132, such as a system bus or network, which can be the same network 150 described herein or a different network. For example, the communications medium 132 may be a local area network while the network 150 may be a wide area network. The components of the EAS manager 115 can be part of a single computing device or part of one or more computing systems comprising one or more computing devices. For example, in some embodiments, the EAS manager 115 can be part of the RFID reader 110. In some embodiments, the EAS manager 115 can be a separate device or devices.

The EAS manager 115 can be in communication with remote I/O systems 155, which can include, without limitation, store management systems, inventory systems, network systems, point-of-sale systems, monitoring systems, alarm systems, external security systems, or any combination of these. For example, the EAS manager 115 can receive information about detected tags from the RFID reader 110 and compare the data to point-of-sale information to decide whether to create an alarm based on the detected tag. As another example, the EAS manager 115 can send information about tags passing through the EAS gates 105 to the inventory system to maintain an accurate inventory of items in the store. The EAS manager 115 can store data from remote I/O systems 155 in its data storage 130 and can use such data during EAS operations. For example, the EAS manager 115 can receive data associating RFID tag identifiers with particular items, which data the EAS manager 115 can use to identify or locate items within and/or passing through monitored zones. In some embodiments, the EAS manager 115 communicates over the network 160 which can be a local area network or a wide area network, a private network or a public network. Advantageously, communication over the network 160 can provide for remote monitoring of the EAS system 100; remote operation of the EAS system 100; remote maintenance of the EAS system 100; and/or e-mail or text communication regarding alerts, system status, or reports.

As described, the EAS system 100 includes a centralized reader and control system coupled to a plurality of EAS gates 105, wherein the centralized reader and control system comprises the multi-port RFID reader 110 and EAS manager 115. Advantageously, in some embodiments, this configuration of the EAS system 100 substantially reduces or eliminates interference between EAS gates 105 and/or antennas 140. The EAS manager 115, RFID reader 110, and gate alarm controllers 135 can be configured to operate antennas 140 such that the signals from the antennas do not interfere with one another. Another advantageous feature, in some embodiments of this design is that the cost and complexity of the EAS system 100 are reduced. By having a centralized reader and control system rather than a reader and control system for each EAS gate 105 in the EAS system 100, the cost of the system can be reduced because a single reader system and controller can operate with a plurality of gates. In addition, complexity of the system 100 can be reduced because implementation of new features can be incorporated at a single entry point rather than at multiple control sites for each gate. Such a configuration enables easier expansion because more EAS gates 105 can be added to the system 100 and incorporated therein through the use of the centralized reader and control system. Another advantage of some embodiments of the EAS system configuration, described more fully herein, is that the configuration can allow for integration with or retro-fitting existing EAS systems without compromising or requiring removal or replacement of the existing systems. Another advantage of the EAS system configuration, described more fully herein, is that the EAS system 100 can be configured to differentiate moving tags from stationary tags over a wide number of EAS gates 105. Another advantage of the EAS system configuration is that the system can be used for additional or alternative purposes besides solely electronic article surveillance. For example, the EAS system 100 can be used as an inventory and locating system. The EAS gates 105 having antennas 140 can be used to detect RFID tags associated with items in the store. Based on the information from the tags, the identity and location of the tag can be calculated and reported to an inventory system.

After an item has been sold, the store can deactivate, disable, or remove the EAS tag such that the EAS system 100 is not triggered when the sold item passes through or enters a monitored zone. For example, the store can have a deactivator system that is configured to physically remove an RFID tag from an item. As another example, the store can utilize a deactivator system that transmits a suitable wireless signal to an RFID tag to be deactivated such that the tag no longer triggers the EAS system 100. For instance, in an EAS tag with an EAS bit, the bit can be reset by the deactivator. As another example, the deactivator system can write a separate OID to the tag which disables the tag. As another example, the deactivator system can send a "kill" signal to the RFID tag which causes it to be disabled. In certain implementations, as described herein, the deactivator system can effectively isolate a tag to be deactivated based on contact between an operator and the tag. In some embodiments, the EAS manager 115 can be configured to enter information corresponding to an EAS tag into a list of sold or unprotected items, thereby virtually removing the tag. For example, when an item is detected in a monitored zone, the EAS system 100 can interface with the point-of-sale system or store management system to check whether the detected tag is on a list of items that have been sold or deactivated.

Example EAS System for Use with a Legacy EAS System

Figure 2A:
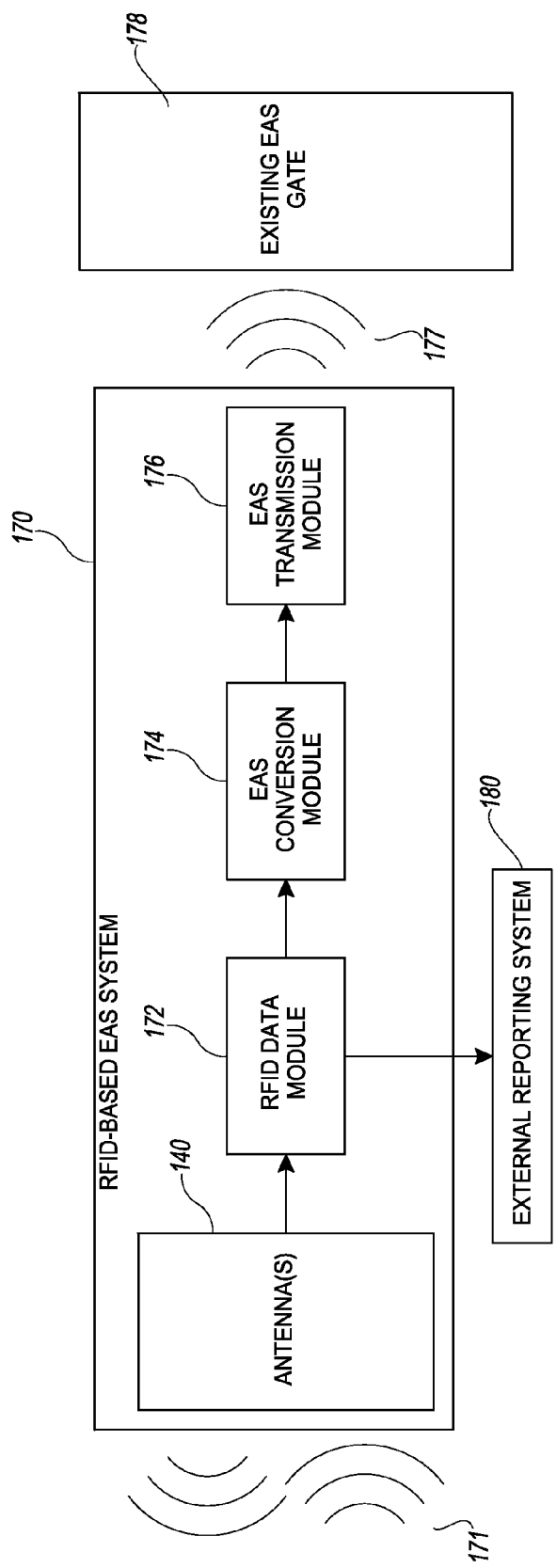
FIG. 2A illustrates a block diagram of some embodiments of an EAS system configured to utilize legacy EAS infrastructure.

FIG. 2A illustrates a block diagram of some embodiments of an EAS system 170 configured to utilize legacy EAS infrastructure. The EAS system 170 can be configured to read RFID tag information and generate an EAS tag signal compatible with an existing or legacy EAS gate 178. In some embodiments, the EAS system 170 can be configured to be installed in conjunction with an existing or legacy EAS system such that the composite system can detect RFID tags and legacy EAS tags, thereby providing RFID-based EAS functionality, utilizing existing EAS infrastructure, and reducing installation costs.

The EAS system 170 can include one or more antennas 140, an RFID data module 172, an EAS conversion module 174, and an EAS transmission module 176. The one or more antennas 140 can be similar to the antennas described herein with reference to FIG. 1, and can be configured to receive an RFID signal 171 from an RFID tag. For example, the antennas 140 can be configured to interrogate passive UHF RFID tags.

The RFID data module 172 can be configured to process information from and control the antennas 140. The data module 172 can include an RFID reader and/or processors, controllers, communication buses, memory, data storage, electronics, and the like configured to process, store, and/or report detected information from RFID tags. For example, the RFID data module 172 can be configured to identify an item based on the detected RFID tag. The RFID data module 172 can be configured to determine whether to trigger an alarm based on detected RFID tag information.

The RFID data module 172 can be configured to control the EAS conversion module 174. In some embodiments, the EAS conversion module 174 converts an RFID tag signal into a defined EAS tag signal. For example, based on information about a tag received from the RFID data module 172, the EAS conversion module 174 can be configured to produce an EAS signal, such as an AM-EAS signal and/or an RF-EAS signal. In some embodiments, the RFID data module 172 sends a binary signal to the EAS conversion module 174 indicating whether to produce an EAS signal. In some embodiments, the RFID data module 172 sends information about what type of EAS signal should be produced and/or what information to include in the EAS signal. For example, the EAS signal can include an EAS bit and the RFID data module 172 can include information about what value to give the EAS bit.

The EAS conversion module 174 can be coupled to the EAS transmission module 176. The EAS transmission module 176 can be configured to transmit an EAS signal 177 based on a signal received from the EAS conversion module 174. The EAS transmission module 176 can include one or more antennas, controllers, processors, memory, electronics and the like configured to produce a defined EAS signal 177. For example, the EAS transmission module 176 can be configured to transmit an AM-EAS signal, a RF-EAS signal, and/or other EAS signals. The EAS transmission module 176 can be configured to transmit an EAS signal 177 with sufficient power such that it can be detected by an existing or legacy EAS gate 178. For example, the EAS transmission module 176 can be configured to alter a power of transmission based on a distance from the RFID-based EAS system 170 and the legacy or existing EAS gate 178.

In some embodiments, the RFID data module 172 is configured to communicate information to an external reporting system 180. The external reporting system can be, for example, a remote I/O system, an auxiliary EAS system, a network, a user computing device, a store management system, an inventory system, a point-of-sale system, or any combination of these. In some embodiments, the RFID data module 172 can be configured to identify and/or report to the external reporting system 180 the type and number of tags detected by the RFID-based EAS system 170, thereby providing RFID-based capabilities to an existing or legacy EAS system.

In some embodiments, the RFID-based EAS system 170 can be configured to monitor the alarm status of the existing or legacy EAS system. For example, the RFID-based EAS system 170 can receive a signal from the legacy EAS gate 178 that an alarm has been triggered. The system 170 can then report this information through the RFID data module 172 to the external reporting system 180.

Figure 2B:
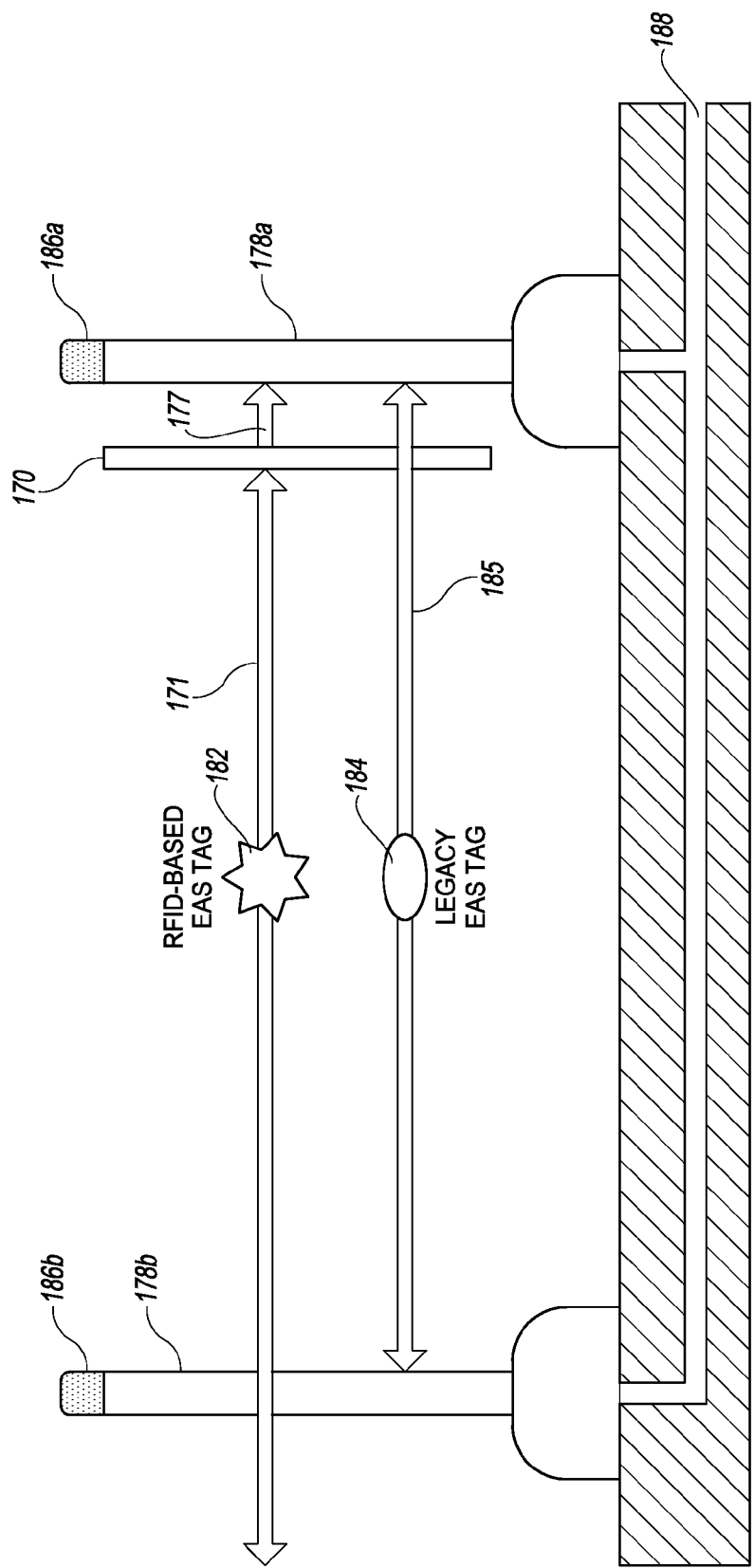
FIG. 2B illustrates an example EAS system incorporated into a legacy EAS system.

FIG. 2B illustrates an example EAS system 170 incorporated into a legacy EAS system. The EAS system 170 can be installed such that the system 170 is in communication with one or more existing or legacy EAS gates 178. For example, the system 170 can be installed in physical proximity to an existing EAS gate 178a such that a converted EAS signal transmitted by the EAS system 170 can be detected by the EAS gate 178a.

The EAS system 170 can be configured to detect an RFID signal 171 from an RFID-based EAS tag 182. In some embodiments, the RFID signal 171 is generated by a passive RFID tag in response to an interrogation signal produced by the EAS system 170. As described herein, the range of RFID tags can exceed the range of other EAS technologies. As depicted in FIG. 2B, in some embodiments the signal 171 from the RFID tag 182 can be detected over a greater range than the signal from a legacy EAS tag 184. As a result, a single RFID-based EAS system 170 can be used to cover an area that requires two or more legacy EAS gates 178a, 178b. Upon detecting the RFID signal 171, the system 170 can be configured to produce an EAS signal 177 that is detectable by the existing EAS gate 178a. In some embodiments, the existing EAS gate 178a can produce a visible alarm 186a upon detecting the EAS signal 177 transmitted by the RFID-based EAS system 170.

In some embodiments, the RFID-based EAS system 170 can be used in to supplement EAS functionality in an existing EAS system. For example, a legacy EAS tag 184 (e.g., an AM-EAS tag or RF-EAS tag) can produce a legacy EAS signal 185 detectable by legacy EAS gates 178a, 178b. The legacy gates 178a, 178b can produce visible alarms 186a, 186b and can send information to the legacy EAS infrastructure through an interface 188. Some embodiments of the RFID-based EAS system 170 allow the detection of RFID-based EAS tags 182 in addition to other EAS tags 184. As a result, the RFID-based EAS system 170 can utilize existing EAS infrastructure and add functionality to an existing EAS system.

Example EAS System with Centralized Reader and Control System

Figure 3:
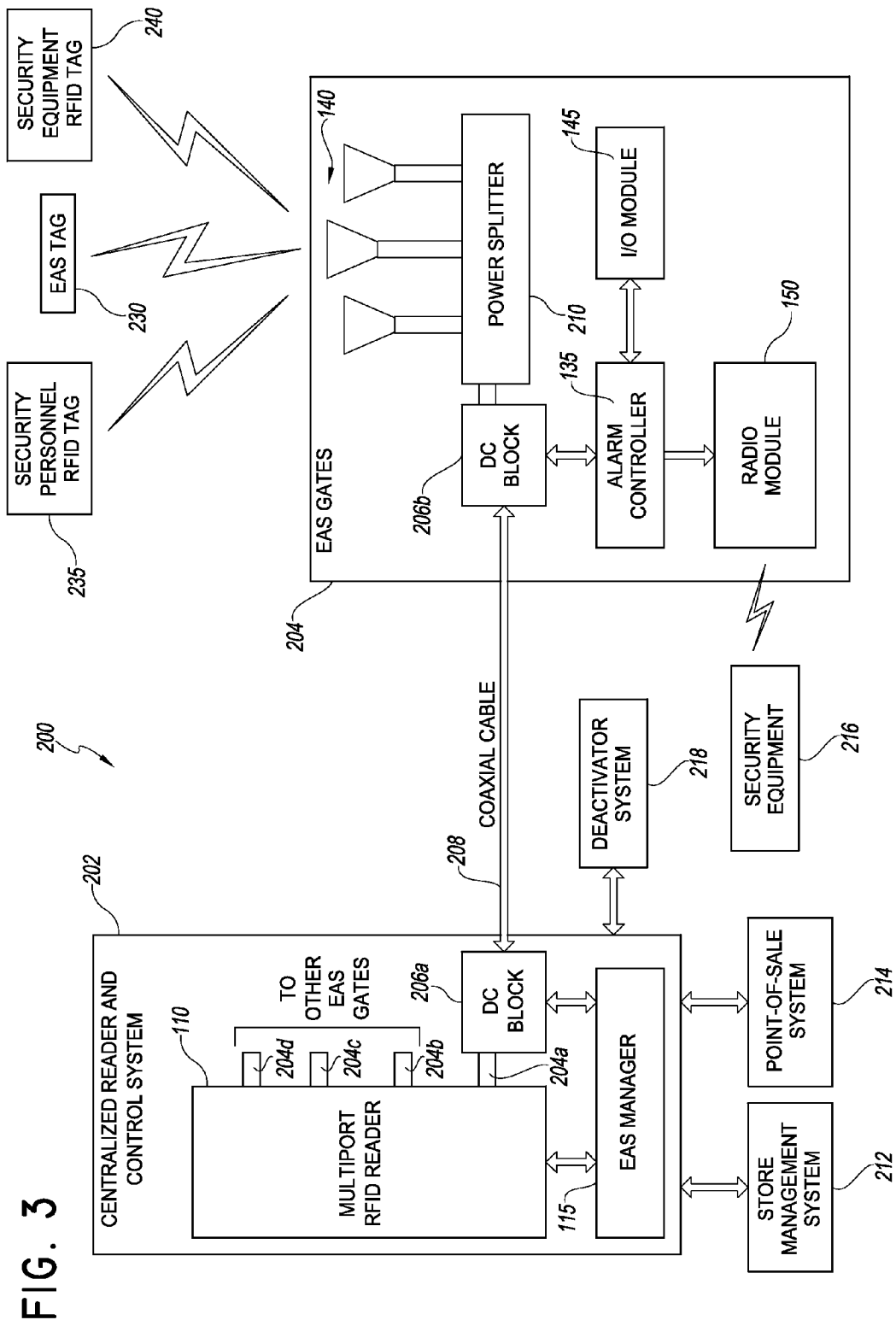
FIG. 3 illustrates a block diagram of an example EAS system incorporating a centralized reader and control system coupled to one or more EAS gates.

FIG. 3 illustrates a block diagram of an example EAS system 200 incorporating a centralized reader and control system 202 coupled to one or more EAS gates 204. The EAS system 200, according to some embodiments, can be configured to control multiple EAS gates from a single, centralized system 202 which contains a multi-port RFID reader 110 and an EAS manager 115. The EAS system 200 incorporating the centralized system 202 can be expanded by adding more EAS gates 204 without adding more readers, reducing cost and complexity associated with expanding EAS systems. Costs can be reduced over other EAS systems because the cost of the RFID reader and controller are spread over multiple EAS gates. Because these costs are reduced, the RFID reader and controller can incorporate advanced performance and capabilities that may otherwise be cost-prohibitive if individual RFID readers were installed at each gate. The EAS system 200 can incorporate new, updated, upgraded, and/or additional functionality by modifying the centralized system 202 rather than each individual EAS gate 204, reducing cost and complexity associated with maintaining and/or upgrading EAS systems. An advantage of the centralized reader and control system 202 is that the design and installation of the EAS gates 204 can be independent of and spaced physical from the centralized system 202. For example, EAS gates 204 in the EAS system 200 can be installed as pedestals, under a floor, in a ceiling, in a wall, in a door jamb, using external antennas, in a cable tray cover, or any combination of these. As another example, EAS gates 204 can be configured to function with existing EAS gates, as described herein in further detail in conjunction with FIG. 4.

The centralized reader and control system 202 can include an RFID reader 110 having multiple ports 204*a-d*, a DC block with bias tee 206*a* coupled to port 204*a*, and the EAS manager 115 operably coupled to the reader 110 and the DC block 206*a*. Not shown in the figure is that each port 204*b-d* can include a DC block that is coupled to a cable (e.g., a coaxial cable, Ethernet cable, custom cable, USB cable, etc.) that is coupled to an EAS gate. In some embodiments, one or more of ports 204*a-d* can be wirelessly coupled to one or more EAS gates. The multi-port RFID reader 110 can be configured to interrogate tags using one or more EAS gates. The EAS manager 115 can be configured to process the data received by the RFID reader 110 and parse out information from individual EAS gates 204 and/or individual antennas 140 within an EAS gate 204. Advantageously, interference between EAS gates 204 can be substantially reduced or eliminated because the EAS manager 115 and reader 110 can multiplex through the EAS gates 204. The DC block with bias tee 206*a* allows the centralized system 202 to transmit both DC power and AC signals to an individual EAS gate 204 using a single cable 208, such as a coaxial cable. For example, the DC block with bias tee 206*a* can include a feed inductor to deliver DC power to an EAS gate and a blocking capacitor to substantially prevent DC voltage from passing through to the EAS manager 115 and/or RFID reader 110. Advantageously, the combination of the DC block 206*a* with the coaxial cable 208 can reduce cost because the coaxial cable can be used for multiple purposes, including, without limitation, delivering RF signals to and from the antennas 140, controlling signals to the EAS gate 204, providing power to the EAS gate 204, and communicating with the circuitry at the EAS gate 204, thereby making it possible to have a centralized RFID reader 110 in the centralized system 202 rather than RFID readers at each EAS gate. In some embodiments, the DC block with bias tee 206*a* can be replaced by a signal management module comprising one or more components and which is configured to allow the transmission of AC and DC signals. The signal management module can be configured to direct a DC signal to provide power to an EAS gate, for example. The signal management module can be configured to direct an AC signal to an RFID reader or EAS manager. The signal management module can be configured to receive and transmit both AC and DC signals using a single cable, such as a twisted-pair cable or coaxial cable.

The EAS gate 204 is operably coupled to the centralized reader and control system 202 through coaxial cable 208. The EAS gate 204 can include DC block with bias tee 206*b* coupled to power splitter 210. The power splitter 210 can be coupled to one or more antennas 140 such that the signal and power for the antennas 140 is provided through the DC block 206*b* and the power splitter 210. Through the use of the splitter 210, the EAS gate 204 can include multiple antennas 140 controlled through a single port of the multi-port RFID reader 110 in the centralized reader and control system 202. Using the power splitter 210 reduces the power at each antenna but allows for designing a configuration of antennas (e.g., a phased antenna pattern) that covers a region of interest using one port on the RFID reader 110. As a result of the reduced power, the range of each individual antenna may be decreased but the reader 110 can handle more gates and antennas, thereby reducing costs and speeding up scanning cycles because the EAS manager 115 does not multiplex through individual antennas at the EAS gate. Advantageously, the power splitter 210 can allow an individual EAS gate 204 to incorporate additional antennas to increase coverage, efficiency, expand capabilities, and the like. As a result, cost and complexity associated with expanding and improving antennas 140 in EAS gates 204 can be reduced compared to other EAS systems.

The EAS gate 204 can include a gate alarm controller 135 coupled to the DC block 206*b*. The gate alarm controller 135 can receive signals from the centralized reader and control system 202 through DC block 206*b*. The gate alarm controller 135 can be configured to control I/O module 145. In some embodiments, the I/O module 145 includes elements configured to produce audible and/or visual indicates of an alarm status at the EAS gate 204. For example, the I/O module 145 can include status lights, speakers, annunciators, displays, and the like. In some embodiments, the I/O module 145 interfaces with a security camera. For example, the I/O module 145 can trigger a camera to capture one or more images or video under defined conditions. In some embodiments, the I/O module 145 includes input for sensors used in the EAS gate 204. The gate alarm controller 135 can be configured to control radio module 150. In some embodiments, the radio module 150 can be configured to communicate wirelessly with security equipment 216, such as a security wand, handheld RFID reader, alarm panels, and the like. For example, under defined conditions, the EAS gate can signal a security wand 216 requesting that the wand 216 seek and/or locate one or more EAS tags. In some embodiments, the radio module 150 can communicate with alarm panels, handheld RFID readers, or other auxiliary security systems.

The EAS gate 204 can be configured to interrogate RFID-based EAS tags 230. RFID-based EAS tags 300 can include, without limitation, disposable tags, single use tags, reusable tags, benefit denial tags, hard tags, labels, and the like. The RFID-based EAS tags 230 can respond with information when interrogated by the RFID reader 110. The information can include, for example, tag identification (TID), object identification (OID), EAS bit, channel number, date of detection, time of detection, number of reads, or any combination of these. In some embodiments, the antennas 140 can be steerable or extendable antennas, and the interrogation information can include data about the relevant angle of the antenna when the antenna detected the tag. In some embodiments, the RFID reader 110 can detect and/or record various physical layer characteristics of the communication link between the EAS gates 204 and the tag 230 such as, for example, phase angle, frequency, received signal strength, transmit power, bit error rates, read rate, or any combination of these. These characteristics can provide sufficient information for the EAS manager 115 to estimate, for example, range from the EAS gate 204 to the tag 230, motion of the tag 230, and/or the position of the tag 230 relative to the EAS gate 204. In some embodiments, when a tag 230 is interrogated, the EAS manager 115 retrieves information about the detected tag 230 as read by an antenna 140. The tag information can include, for example, TID, OID, antenna information, EAS gate information, channel number, transmission power, frequency, RSSI value, date and/or time of detection, phase angle, number of reads, or any combination of these. In some embodiments, the antenna 140 can be a steerable antenna and the tag information can include information about the relevant angle of the antenna when the antenna 140 read the tag 230. The tag information can be retrieved from storage or it can be passed directly to the EAS manager 115 as it is read.

The EAS gate 204 can be configured to interrogate RFID-based tags associated with security personnel 235. For example, security personnel 235 can have RFID tags attached, affixed, or otherwise associated with their clothing or body. The EAS gate 204 can interrogate the RFID tags and the EAS manager 115 can determine the position, location, and/or the identity of the security personnel 235. This allows the EAS system, for example, to monitor the status of EAS gates 204 (e.g., whether security personnel 235 are monitoring the area), monitor the status of security personnel 235, and/or identify security personnel 235 who are near an alarming gate.

The EAS gate 204 can be configured to interrogate RFID-based tags associated with security equipment 240. For example, a security wand 216 can have an associated RFID tag 240 such that the EAS system 200 can identify the location of the security wand 216. This can be useful, for example, when an item triggers an alarm, the EAS system 200 can identify security personnel 235 who are near the triggered EAS gate 204 and what security equipment 240 they have with them. This can allow the EAS system 200 to use the radio module 150 at the triggered EAS gate 204 to send a list of the tags which triggered the alarm to the security equipment 240 (e.g., the security wand 216) and to alert the security personnel 235 that an alarm has been triggered. The EAS system 200 could also use the radio module 150 to put the security equipment 240 into a particular mode such as, for example, a search mode configured to locate and identify the specific RFID tag(s) which caused the alarm.

The centralized reader and control system 202 can be configured to communicate with a store management system 212. The centralized system 202 and store management system 212 can communicate using wired or wireless communication over direct, indirect, or networked communication links. For example, the centralized reader and control system 202 can be connected to a private local area network to which the store management system 212 is also connected. As another example, the centralized reader and control system 202 can be connected to the Internet and can upload and download information to a server to which the store management system 212 is also connected. As another example, the centralized system 202 and the store management system 212 can be directly connected to one another. The communication between the centralized system 202 and the store management system 212 can allow the EAS system 200, for example, to update inventory information based on information collected at the EAS gates 204, to check detected tags against store inventory lists, locate and/or identify items associated with detected tags, transmit item information to security personnel 235, and the like.

The centralized reader and control system 202 can be configured to communicate with a point-of-sale ("POS") system 214. Similar to the communication between the store management system 212 and the centralized system 202, the POS system 214 can communicate with the centralized reader and control system 202 using wired or wireless communication over direct, indirect, or networked communication links. Communication between the centralized system 202 and the POS system 214 can allow the EAS system 200, for example, to check tags detected at EAS gates 204 against information related to sold or deactivated items. This can reduce the frequency of undesirable false alarms related to improperly deactivated tags. Advantageously, when compared to some EAS systems incorporating multiple reader and control systems, some embodiments of the centralized system 202 can provide a relatively simple connection with less traffic issues to the store management system 212 and the POS system 214.

The EAS system 200 can include a deactivator system 218 configured to deactivate, remove, and/or disable EAS tags 230. The deactivator system 218 can be coupled to the centralized reader and control system 202 or it can be a stand-alone system. In some embodiments, the deactivator system 218 can communicate information about deactivated tags to the centralized system 202, the EAS gates 204, the store management system 212, and/or the POS system 214. This information can be used to update inventory lists, update point-of-sale information, and/or reduce or eliminate false alarms based on improperly deactivated tags. In some embodiments, the deactivator system 218 is a system that alters the properties of the EAS tags 230 in some way such that they do not trigger an alarm when detected by the EAS gates 204. For example, the deactivator system 218 can reset an EAS bit in the EAS tag 230. As another example, the deactivator system 218 can write a separate OID to the tag which disables the tag 230. As another example, the deactivator system can send a "kill" signal to the EAS tag 230 which causes it to be disabled. In some embodiments, the deactivator system 218 is a device that removes the EAS tag 230 from the item with which it is associated. In some embodiments, the deactivator system 218 is a system that reads the EAS tag 230 information and sends that information to the centralized reader and control system 202, the EAS gates 204, the store management system 212, and/or the POS system 214 to indicate that the EAS tag 230 has been deactivated. For example, the deactivator system 218 can read tag or object identification from the EAS tag 230 and send this information to the EAS gates 204, instructing the gates to ignore the tag 230.

As an example of the functionality of an embodiment the EAS system 200, the EAS gate 204 can detect the EAS tag 230 as it is carried through a monitored zone established by the gate's antennas 140. The centralized reader and control system 202 can select the port 204a on the RFID reader 210 and analyze the data from the EAS gate 204. The EAS manager 115 can analyze the information from the detected tag 230, for example by applying false alarm avoidance filters and/or determining position and/or motion. The EAS manager 115 can also compare the information from the tag 230 to information stored on the EAS manager 115, from the store management system 212, from the POS system, and/or from the deactivator system 218. Based on this analysis and comparison, the EAS manager 115 can decide to trigger an alarm. The centralized reader and control system 202 can send the alarm signal through the DC block 206a over the coaxial cable 208 and to the alarm controller 135 through the DC block 206b. The alarm controller 135 can receive the alarm signal and trigger a visual and/or audible alarm using the I/O module 145. The alarm controller 135 can then notify security personnel 235 that are near the gate that an alarm has been triggered and can send a list of tags triggering the alarm to the security wand 216 through the radio module 150. In some embodiments, the EAS system 200 can initiate a local alarm, such as an alarm localized to one or more EAS gates 204, and/or the EAS system 200 can generate a store-wide alarm, such as sending e-mail or text message alerts to defined personnel.

Example EAS Retrofit System with Centralized Reader and Control System

Figure 4:
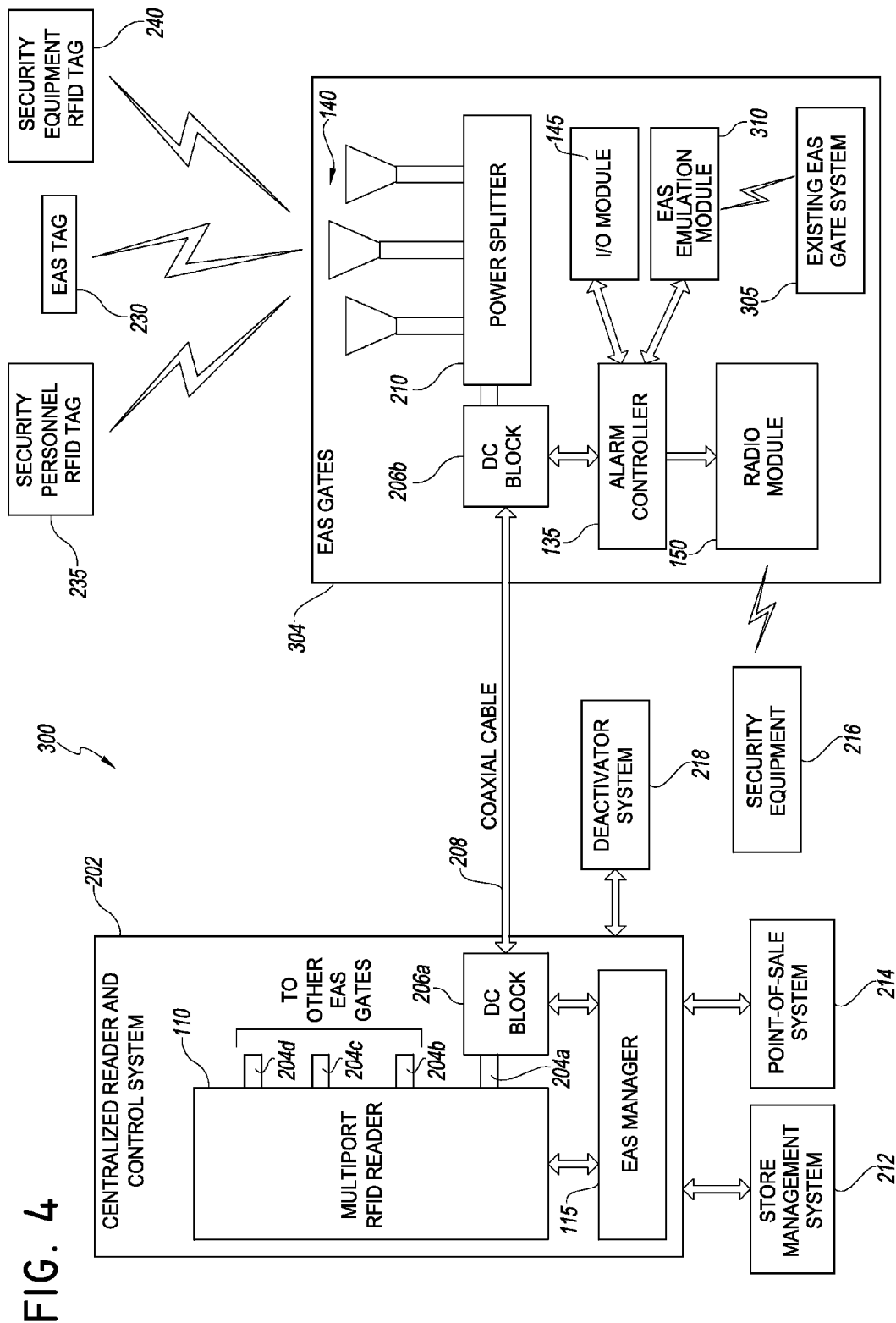
FIG. 4 illustrates a block diagram of an example EAS system that operates with an existing EAS gate system.

FIG. 4 illustrates a block diagram of an example EAS system 300 that operates with an existing EAS gate system 305. For example, the EAS system 100 can comprise an adapter kit that adds RFID EAS capability to an existing EAS system, such as an AM-EAS or RF-EAS system, while maintaining the capability and data integrating platform or infrastructure of the existing system. In another example, the functionality of the existing EAS system is replaced with an RFID-based EAS system using the EAS system 300.

The EAS system 300 is similar to the EAS system 200 described in conjunction with FIG. 3. The EAS gate 304 can include an EAS emulation module 310 coupled to the gate alarm controller 135. The EAS emulation module 310 can be configured to produce a wireless signal that is compatible with and detectable by the original EAS gate system 305 and suitable to trigger an alarm response in the original system. For example, where the original EAS gate system 305 is configured to detect AM-EAS tags, the EAS emulation module 310 can produce a simulated AM-EAS signal in response to an alarm signal from the alarm controller 135. The AM-EAS signal can be an electromagnetic signal configured to have sufficient power and an appropriate frequency to be detected by and trigger the original EAS gate system 305. Similarly, where the original EAS gate system 305 is a RF-EAS system, the EAS emulation module 310 can produce a suitable RF-EAS tag signal to trigger the original gate system 305.

As an example of the functionality of the EAS system 300 which is compatible with existing EAS gate system 305, the EAS gate 304 can detect the EAS tag 230 as it is carried through a monitored zone established by the gate's antennas 140. The centralized reader and control system 202 can select the port 204*a* on the RFID reader 210 and analyze the data from the EAS gate 304. The EAS manager 115 can analyze the information from the detected tag 230, for example by applying false alarm avoidance filters and/or determining position and/or motion. The EAS manager 115 can also compare the information from the tag 230 to information stored on the EAS manager 115, from the store management system 212, from the POS system, and/or from the deactivator system 218. Based on this analysis and comparison, the EAS manager 115 can decide to trigger an alarm. The centralized reader and control system 202 can send the alarm signal through the DC block 206*a* over the coaxial cable 208 and to the alarm controller 135 through the DC block 206*b*. The alarm controller 135 can receive the alarm signal and send an emulated EAS signal to the existing EAS gate system 305 through the EAS emulation module 310. The existing gate system 305 can then proceed to perform as it would had it originally detected the EAS tag 230. For example, the existing EAS gate system 305 can trigger an audible and/or visual alarm. In some embodiments, the alarm controller 135 can notify security personnel 235 that are near the gate that an alarm has been triggered and can send a list of tags triggering the alarm to the security wand 216 through the radio module 150. In some embodiments, the EAS system 300 can initiate a local alarm, such as an alarm localized to one or more EAS gates 304, and/or the EAS system 300 can generate a store-wide alarm, such as sending e-mail or text message alerts to defined personnel.

Advantageously, this design allows the EAS system 300 to use existing EAS infrastructure to generate alarms. The EAS system 300 can be configured to couple to existing EAS gates 305 and alarms without hardwiring into those systems through the EAS emulation module 310 which generates a strong signal that imitates the signal from the type of tag the original EAS gate 305 was designed to detect. In some embodiments, the EAS system 300 is used to retrofit an existing EAS system without compromising the existing system. In some embodiments, the EAS system 300 augments the capabilities of an existing EAS system through retrofitting. For example, the EAS system 300 can detect RFID-based EAS tags as well as utilize other EAS technologies, such as AM-EAS or RF-EAS. As another advantage, in some embodiments, the retrofit design allows a store to utilize a single RFID tag for each item because the RFID tag can be used for inventory purposes as well as for EAS. This reduces labor, cost, and complexity compared to systems that require an additional, separate EAS tag.

Example EAS Gates

Figure 5:
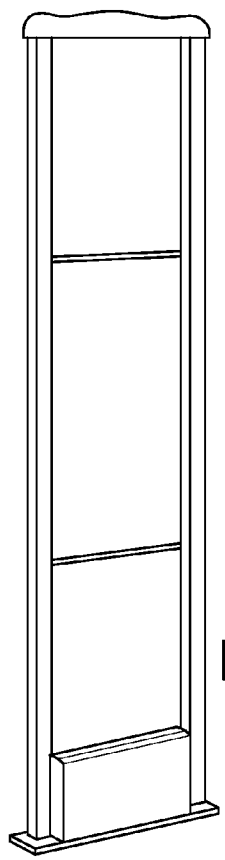
FIG. 5 illustrates some embodiments of an EAS gate installed in a pedestal structure.

FIG. 5 illustrates some embodiments of an EAS gate 404 installed in a pedestal structure. In some embodiments of an EAS system, pedestal structures are positioned at an entrance, exit or other points of interest throughout the store. They can be used in tandem to establish a monitored zone that extends between the pedestal structures. EAS gates incorporated into pedestal structures can provide a visual deterrent to theft.

In some embodiments, the EAS gate 404 is installed in the pedestal structure similar to pedestal structures incorporating AM-EAS functionality and/or RF-EAS functionality. In some embodiments, the EAS gate 404 incorporates RFID-based EAS capabilities through a retrofitting procedure. For example, a cover or sleeve can be placed over an existing pedestal structure and the cover or sleeve can provide components used to perform RFID-based EAS.

The EAS gate 404 installed in the pedestal structure can incorporate elements of the EAS gates described herein with reference to FIGS. 1-4. For example, the EAS gate 404 can include one or more antennas 140, an alarm gate controller 135, an I/O module 145, and/or a radio module 150. The EAS gate 404 can be coupled to a multi-port RFID reader 110 and/or an EAS manager 115. In some embodiments, the EAS gate 404 incorporates an EAS emulation module 310 for use with an existing EAS gate 305.

Figure 6:
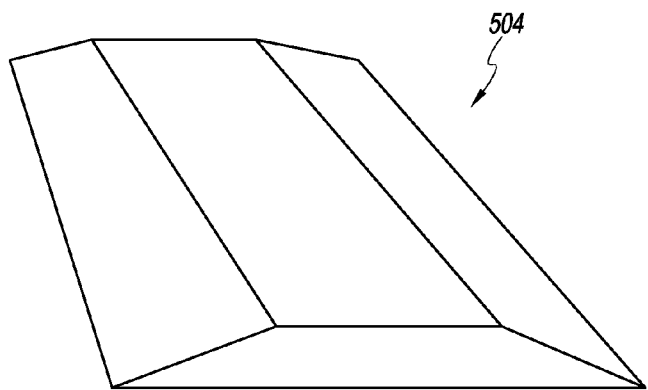
FIG. 6 illustrates some embodiments of an EAS gate installed in a cable tray cover.

FIG. 6 illustrates some embodiments of an EAS gate 504 installed in a cable tray cover. The cable tray cover typically can be used to provide mechanical protection for cables passing through areas subject to foot or vehicle traffic. By incorporating components of an EAS system into the cable tray cover, EAS functionality can be provided in areas where there is foot and/or vehicle traffic. The EAS gate 504 installed in the cable tray cover can incorporate elements of the EAS gates described herein with reference to FIGS. 1-4. For example, the EAS gate 504 can include one or more antennas 140, an alarm gate controller 135, an I/O module 145, and/or a radio module 150. The EAS gate 404 can be coupled to a multi-port RFID reader 110 and/or an EAS manager 115. In some embodiments, the EAS gate 504 incorporates an EAS emulation module 310 for use with an existing EAS gate 305.

Figure 7:
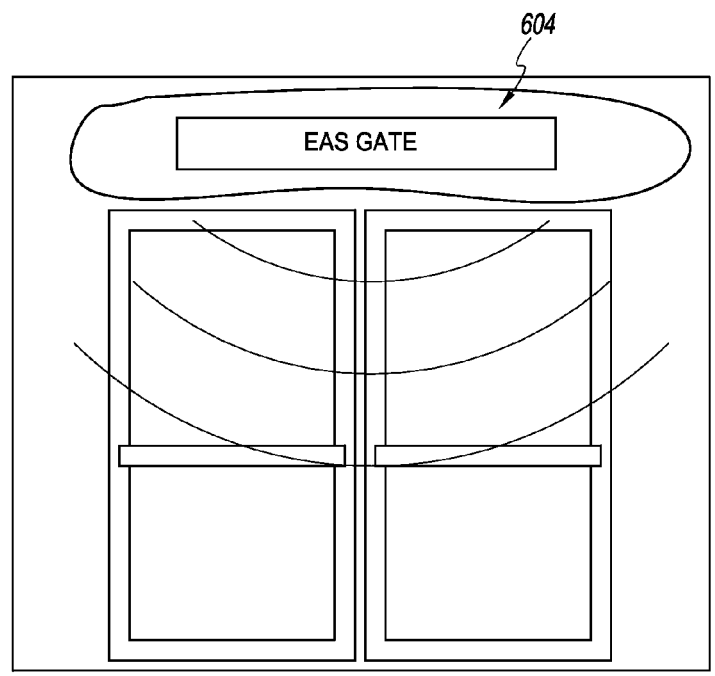
FIG. 7 illustrates some embodiments of an EAS gate installed in a wall.

FIG. 7 illustrates some embodiments of an EAS gate 604 installed in a wall. The EAS gate 604 can be positioned to establish a monitored zone surrounding an entrance, exit, or other points of interest throughout the store. When installed in a wall, the EAS gate 604 can be entirely or partially hidden from view, and/or configured with a low profile, thereby providing EAS functionality without disrupting the aesthetic design of the store. The EAS gate 604 installed in the wall can incorporate elements of the EAS gates described herein with reference to FIGS. 1-4. For example, the EAS gate 604 can include one or more antennas 140, an alarm gate controller 135, an I/O module 145, and/or a radio module 150. The EAS gate 404 can be coupled to a multi-port RFID reader 110 and/or an EAS manager 115. In some embodiments, the EAS gate 604 incorporates an EAS emulation module 310 for use with an existing EAS gate 305. Similar to FIG. 7, some embodiments of an EAS gate 604 can be installed in a door jamb, in a ceiling, in a floor, or in another similar location.

Example EAS System Configured to Localize Alarming Item

Figure 8:
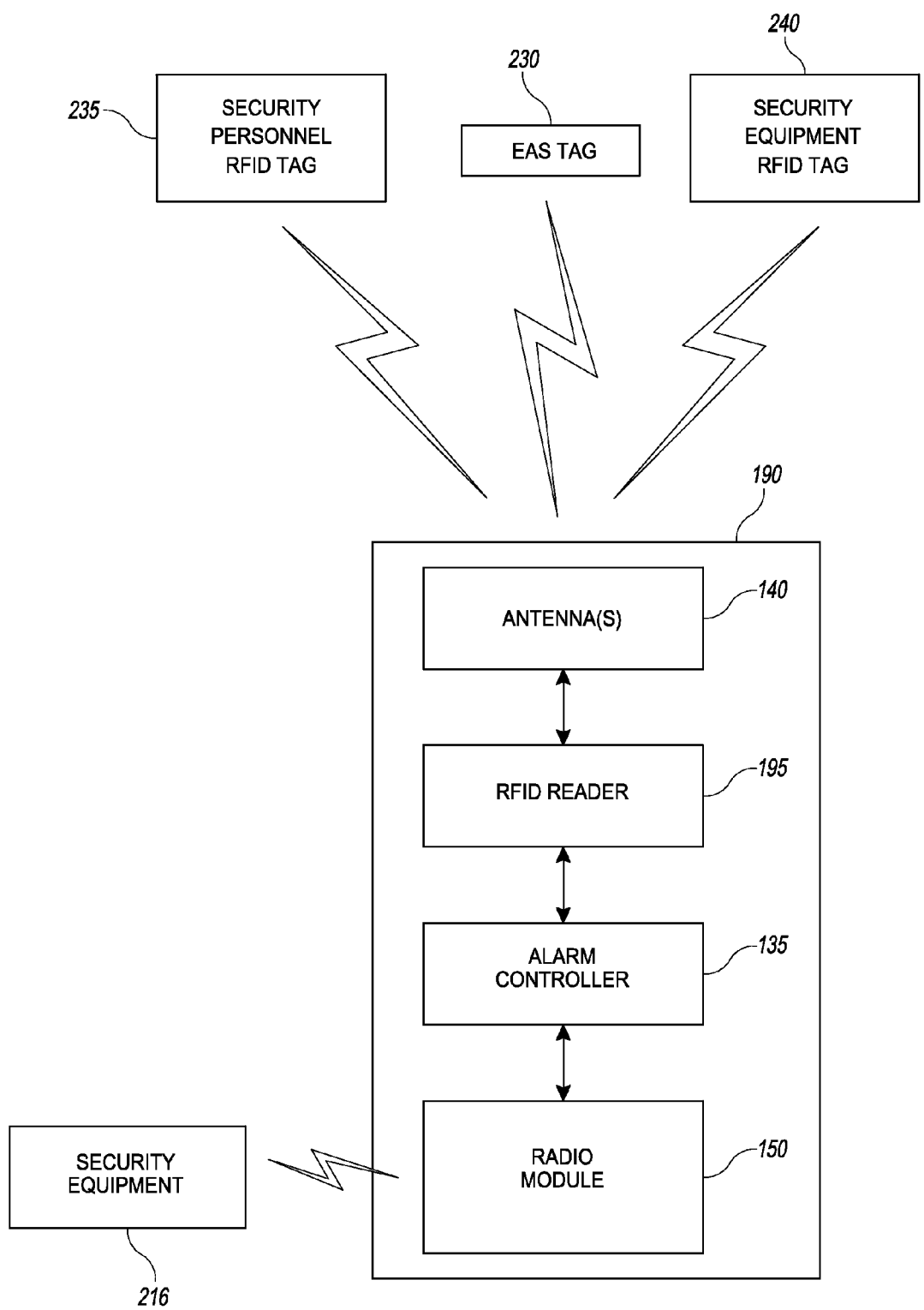
FIG. 8 illustrates a block diagram of some embodiments of an EAS system configured to identify proximate security personnel and send tag information to the proximate personnel's security equipment.

FIG. 8 illustrates a block diagram of some embodiments of an EAS system 190 configured to identify proximate security personnel and send tag information to the proximate personnel's security equipment. Similar to embodiments described herein with reference to FIGS. 1, 3, and 4, the EAS system 190 can include one or more antennas 140, an alarm controller 135, and a radio module 150.

The EAS system 190 can include an RFID reader 195 configured to control and process information from the one or more antennas 140. In some embodiments of the EAS system 190, the RFID reader 195 is similar to the multi-port reader 110 described herein with reference to FIGS. 1, 3, and 4. For example, the RFID reader 195 can be a high-sensitivity RFID reader configured to report phase angle, received signal strength, and/or phase shift, such as a Sirit IN610 reader or an Impinj Revolution reader.

The EAS system 190 can detect a security personnel RFID tag 235 and/or a security equipment RFID tag 240. In some embodiments, as described herein, the alarm controller 135 can determine a range and/or position of the security personnel based on the signal from the security personnel RFID tag 235. In some embodiments, the alarm controller 135 can determine what security equipment the security personnel has based on the signal from the security equipment RFID tag 240. Using the radio module 150, some embodiments of the EAS system 190 can send tag information to security equipment 216 (e.g., a security wand or a handheld RFID reader). For example, the EAS system 190 can send a list of tags that triggered an alarm and information about the items associated with the tags. By sending the information to the security equipment 216, the security equipment can be placed in a search mode (e.g., a Geiger-counter mode) that allows security personnel to locate the item or items triggering the alarm.

Figure 9:
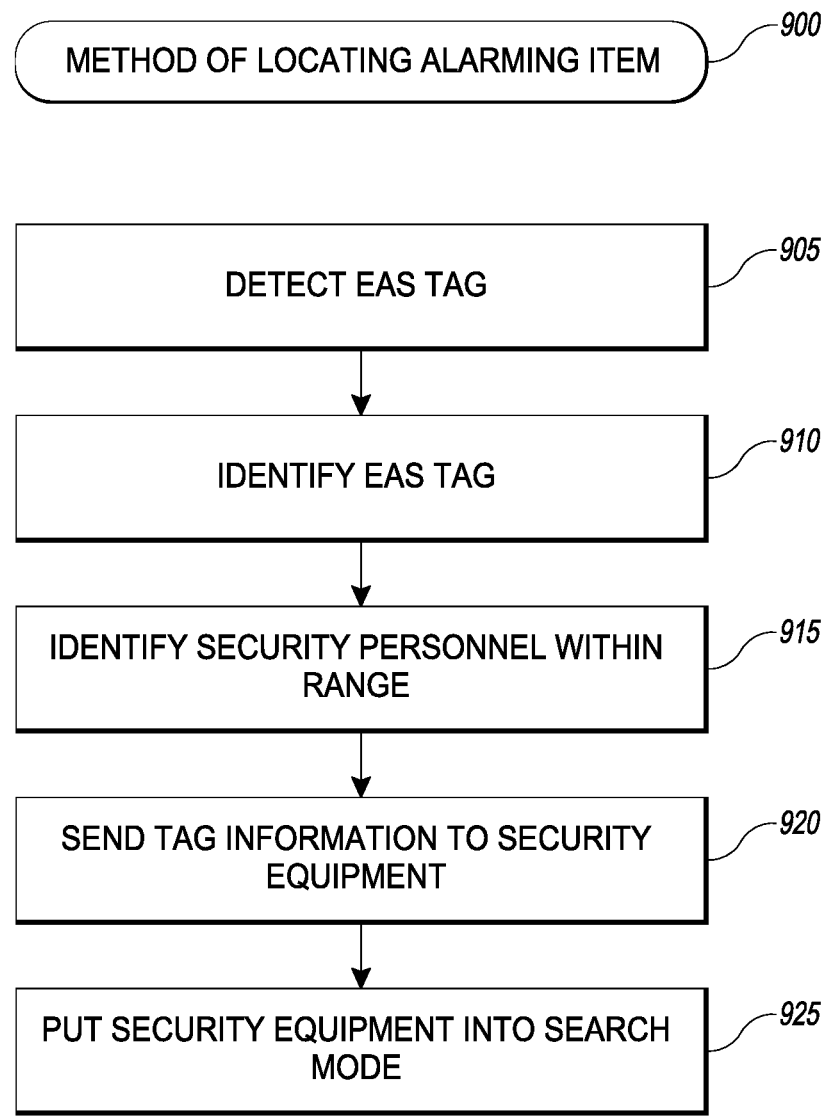
FIG. 9 illustrates a flow chart of some embodiments of a method for locating an alarming item by identifying proximate security personnel and sending information about the alarming item to the proximate personnel's security equipment.

FIG. 9 illustrates a flow chart of some embodiments of a method 900 for locating an alarming item by identifying proximate security personnel and sending information about the alarming item to the proximate personnel's security equipment. Because RFID tags provide for a larger range, as described herein, in some embodiments an area over which a detected tag can be located increases compared to traditional EAS systems. As a result, a method 900 is provided to enable a person to identify and/or locate one or more items that have triggered an alarm in an EAS system.

In block 905, the EAS system detects the presence of one or more EAS tags in a monitored zone. Detecting the presence of the EAS tag can include interrogating the tag using one or more antennas in an EAS gate. When the tag is interrogated, a suitable RF signal is transmitted by the EAS gate and received by the tag. The tag generates a response, either through active or passive means, which is then detected by the EAS gate. This information can be passed to an RFID reader, such as the RFID reader 190 described herein with reference to FIG. 8.

In block 910, the EAS system identifies the one or more EAS tags. Identifying the tag can include determining, for example, the tag's TID, the tag's OID, another tag identification number, an item associated with the tag, and the like. Based on the information returned from the tag during the interrogation in block 905, the EAS manager 115 can identify the tag. In some embodiments, the tag can respond to interrogation with a TID which can be associated with a particular item. The EAS system can have a database of TID information or it can interface with a store management system to correlate the TID of the tag with an item in the store. In some embodiments, the tag can respond to interrogation with an OID which can incorporate item information within the number. For example, the OID can include a UPC of an item which uniquely identifies the item associated with the detected tag. In some embodiments, the tag is an EPC Gen-2 extension tag which incorporates identifiable information in a response to interrogation.

In block 915, the EAS system identifies security personnel within a defined range of one or more EAS gates in the EAS system. Based on a signal from an RFID tag associated with the security personnel, the EAS system can determine a range and/or position of the security personnel. In some embodiments, the EAS system can determine which person is closest to an alarming gate and select that person for delivery of tag information. In some embodiments, the EAS system can send tag information to all security personnel within range of an EAS gate. In some embodiments, the EAS system identifies security equipment associated with security personnel through RFID tags associated with the equipment. The EAS system can determine which person to send tag information based on their equipment.

In block 920, the EAS system sends information about the one or more detected EAS tags to security equipment associated with the identified security personnel. The information can include the number and/or type of items that triggered an alarm. The information can be sent over a wireless signal to a security wand and/or handheld RFID reader.

In block 925, the EAS system puts the security equipment into a search mode. The search mode can include a Geiger-counter mode that the security personnel can use to locate one or more of the items that triggered an alarm. In some embodiments, receiving the list in block 920 can trigger the security equipment to enter into the search mode. In some embodiments, the search mode can include a visual, audible, tactile, or other indicator of relative range or position of tags on the list of tags sent to the equipment.

Example Deactivator

Figure 10:
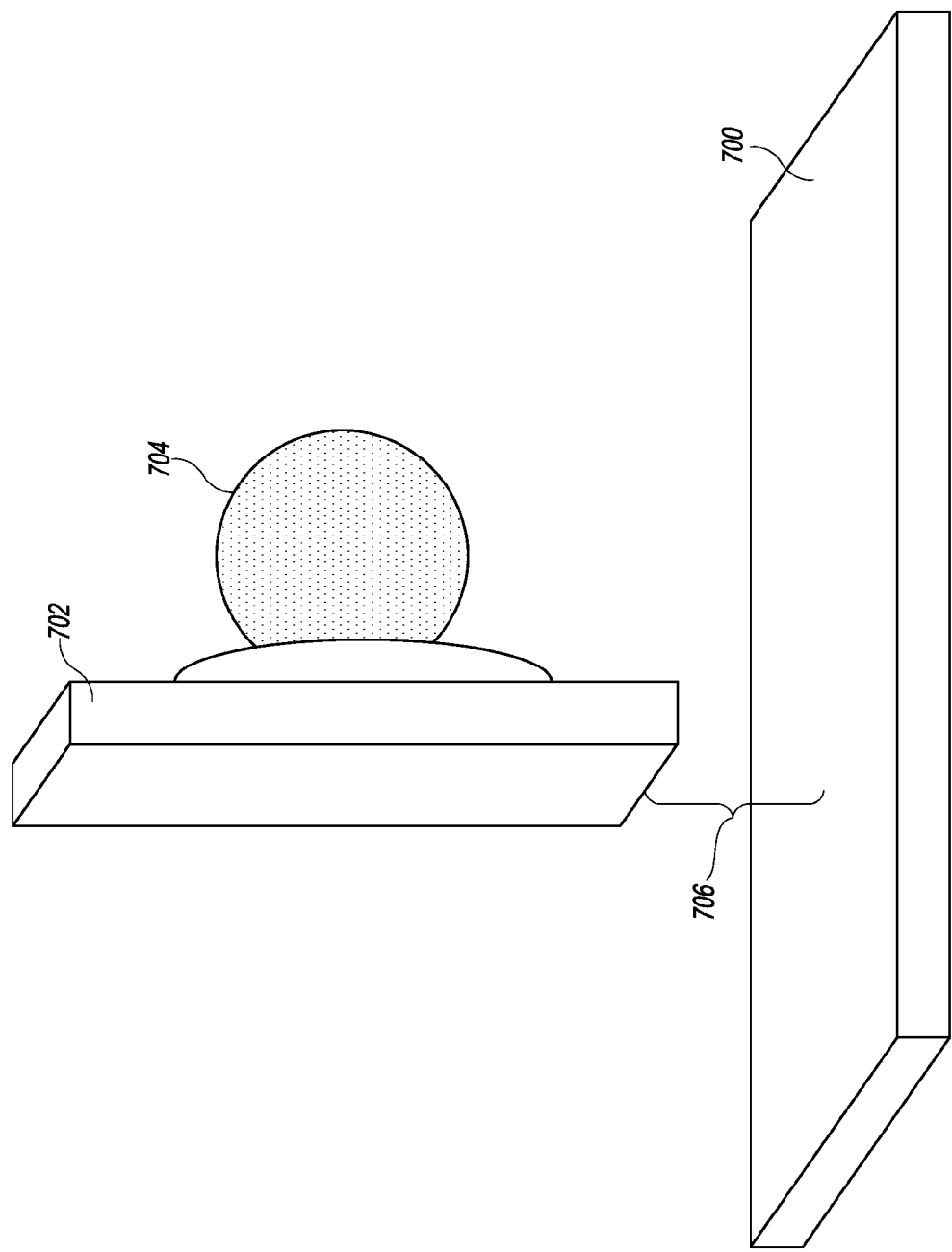
FIG. 10 illustrates an example deactivator for use with EAS systems described in conjunction with FIGS. 1-4.

FIG. 10 illustrates an example deactivator 700 for use with the EAS systems 100, 170, 200, and/or 300 described in conjunction with FIGS. 1-4, respectively. The deactivator 700 can be at a point-of-sale to deactivate an EAS tag 702 such that when the tag 702 enters into a monitored zone an alarm is not triggered. The deactivator 700 can deactivate the EAS tag 702 by resetting an EAS bit, writing a separate OID to the tag 702 thereby disabling it, sending a "kill" function to the tag 702, and/or reading the identification of the tag 702 and sending that information to EAS gates, etc.

The deactivator 700 can be used at a point-of-sale register by an operator desiring to deactivate the tag 702. The operator can touch the tag 702 using an object 704 such as a finger, hand, or other instrument which forms a link between the deactivator 700 and the tag 702 through the capacitance of the object 704. The operator can bring the tag 702 within a suitable distance 706 from the deactivator 700 to initiate the deactivation procedure. In some embodiments, the suitable distance 706 can be less than or equal to about 1 ft., less than or equal to about 6 in., less than or equal to about 3 in., less than or equal to about 2 in., or less than or equal to about 1 in. The deactivator 700 can become active when the object 704 (e.g., the operator's hand) comes within a suitable distance 706 from the deactivator. When the deactivator 700 becomes active, the deactivator 700 can use a suitable wireless signal to deactivate the tag 702 that is being contacted with the object 704. The contact between the tag 702 and the object 704 can provide a "ground" path to, or otherwise change the electrical characteristics of, the tag 702, which provides a stronger link to the tag 702 being contacted than other tags. The deactivator 700 can use the change in capacitance on that leg of the antenna to trigger the deactivation of the tag 702. In some embodiments, the operator can selectively isolate and deactivate the tag 702 in a relatively quick and easy manner using the deactivator 700.

Method for Identifying Items Moving Through an EAS Gate

Figure 11:
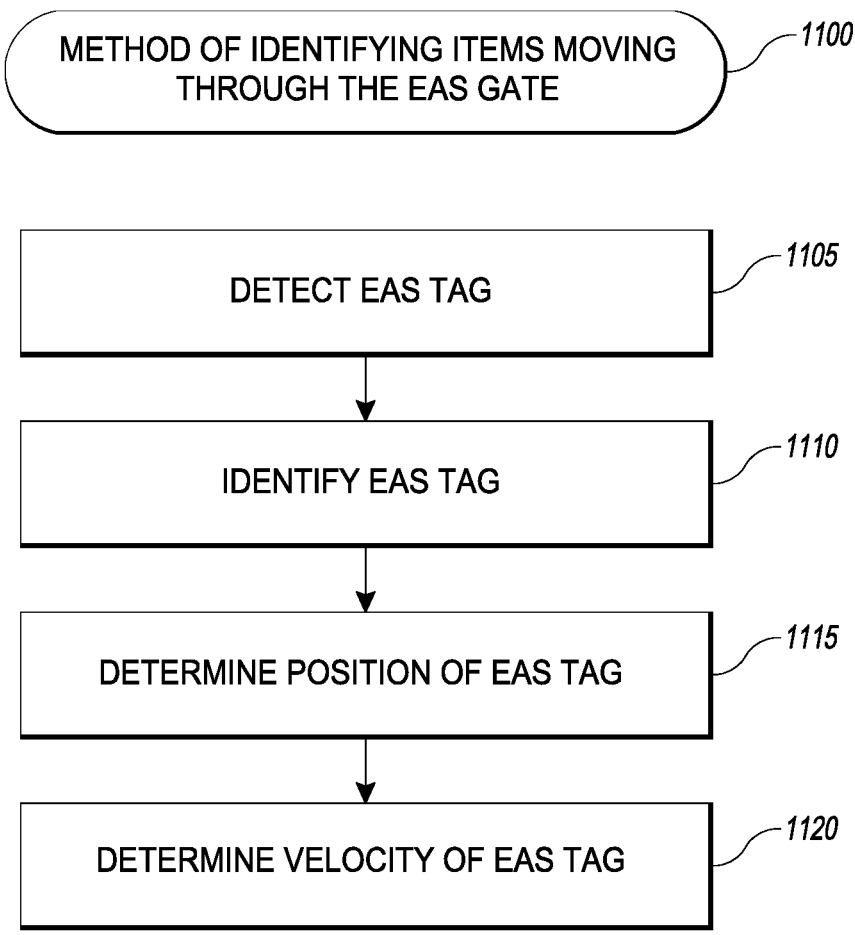
FIG. 11 illustrates a flow chart of some embodiments of a method for identifying EAS tags that are moving through an EAS gate as described herein with reference to FIGS. 1 through 8.

FIG. 11 illustrates a flow chart of some embodiments of a method 1100 for identifying EAS tags that are approaching or moving through an EAS gate as described herein with reference to FIGS. 1 through 8. The method 1100 can provide the identification, position, and/or velocity of a tag detected by one or more EAS gates. For ease of description, the method 1100 will be described as being performed by an EAS manager 115. However, one or more steps in the method can be performed wholly or partially by other components of the EAS system, including a gate alarm controller 135, an RFID reader, an RFID data module 172, an antenna 140, or the like.

In block 1105, the EAS manager 115 detects the presence of an EAS tag in a monitored zone. Detecting the presence of the EAS tag can include interrogating the tag using one or more antennas in an EAS gate. When the tag is interrogated, a suitable RF signal is transmitted by the EAS gate and received by the tag. The tag generates a response, either through active or passive means, which is then detected by the EAS gate. This information can be passed to an RFID reader, such as the multi-port RFID reader 110 described herein with reference to FIGS. 1, 3, and 4. In some embodiments, one or more EAS gates detect the tag and information is transmitted that can be used to identify the tag and/or determine its position and/or velocity.

In block 1110, the EAS manager 115 identifies the EAS tag. Identifying the tag can include determining, for example, the tag's TID, the tag's OID, another tag identification number, an item associated with the tag, and the like. Based on the information returned from the tag during the interrogation in block 1105, the EAS manager 115 can identify the tag. In some embodiments, the tag can respond to interrogation with a TID which can be associated with a particular item. The EAS manager 115 can have a database of TID information or it can interface with a store management system to correlate the TID of the tag with an item in the store. In some embodiments, the tag can respond to interrogation with an OID which can incorporate item information within the number. For example, the OID can include a UPC of an item which uniquely identifies the item associated with the detected tag. In some embodiments, the tag is an EPC Gen-2 extension tag which incorporates identifiable information in a response to interrogation.

In block 1115, the EAS manager 115 determines the position of the EAS tag. The position of the tag can be calculated relative to the position of the EAS gate which detected the tag. To calculate the position, the EAS manager can calculate the range of the tag, or the distance from the EAS gate to the tag, based at least in part on the tag information retrieved in block 1110. The range to the tag can be determined for each EAS gate which detected the tag. In some embodiments utilizing passive RFID tags, the range can be calculated by solving a series of phase angle equations at different frequencies. The phase angle at a given frequency is related to the propagation distance from the signal source to the tag and back to where the signal is read. The total propagation distance can be represented as an integer number of wavelengths plus a remainder, which corresponds to the phase angle. For example, in a system where the frequency of the antennas can change, the phase angle of the return signal from the tag can be reported by the RFID reader at a plurality of frequencies. For a given distance between the antenna and the tag, the phase angle is a linear function of the frequency and the derivative of that function corresponds to the propagation distance.

The EAS manager 115 can determine the position of the specified tag relative to the physical layout of the store and/or relative to the EAS gates in the EAS system. Based on the range information calculated for each EAS gate, the EAS manager 115 can determine the position of the tag. One method of determining the position of the tag is based on intersecting spheres with a radius equal to the range calculated for each antenna. For example, the EAS manager 115 can determine that the range from a first EAS gate to the tag is a first distance, R1. Similarly, the EAS manager 115 can determine that the ranges from second and third EAS gates are second and third distances, R2 and R3. The EAS manager 115 can then create three spheres with radii equal to the calculated ranges and centered on the respective EAS gates. Using trilateration, the system can then determine the position of the tag, within some margin of error, to the position where the three spheres intersect. The intersection of three spheres can produce two points, but in this scenario one of those points would be above an elevated real or imaginary plane, such as above or within the ceiling. This point can be dismissed because the tag is known to be beneath this elevated plane, such as the ceiling, and the position can be uniquely determined relative to the three EAS gates.

Another method of determining the position of the tag includes using triangulation. To utilize triangulation, the EAS manager 115 can use angular information from the EAS gates. For example, if the antennas 140 in the EAS gates comprise a steerable antenna array, then the transmission angle of the antenna that detected the tag can be included in the tag information retrieved in block 1105. Combining the angular information with the range information, the position of the tag can be determined. Similarly, if the tag is detected by a single steerable antenna, the localization system can determine the position of the tag based on the calculated range for that EAS gate and the angular information.

The position of the tag can be specified relative to the EAS gates or relative to the physical layout of the store. In some embodiments, specialty location tags are attached in a non-mobile manner to certain landmarks within a store. For example, specialty tags can be placed or affixed at exits, along walls, near dressing rooms, along shelves, or any combination of these. The EAS manager 115 can detect these tags for which the absolute position is known. Based on these readings, the EAS manager 115 can create a map of at least a portion of the store and calculate positions of tags relative to this generated map. For example, the position of a specified tag can be reported as a relative position from a landmark within the store, like 10 ft. south from the northwest exit and 3 ft. off the floor. As another example, the position can be reported using Cartesian coordinates in a relative grid, such as reporting the position to be 8 ft. S, 2 ft. E, and 5 ft. off the floor. The position can be reported in three dimensions, for example, using relative or absolute positions, using Cartesian coordinates, spherical coordinates, cylindrical coordinates, or any combination of these.

The specialty tags can be permanent or can be removed after the system has been installed and/or calibrated. Specialty tags can be electronic tags that respond with a unique identification when interrogated by a reader. For example, the specialty tags can be passive RFID tags that respond to interrogation with a fixed serial number that does not coincide with any other products in the store.

Several other methods for ranging can be used in addition to or instead of the ranging methods described above. These additional methods can add to the accuracy of the determined tag position. Some embodiments can include measuring the return signal strength from the tag and correlating the signal strength with the distance. For example, a stronger signal from the tag in a first EAS gate can indicate the tag is relatively closer to the first EAS gate compared to a second EAS gate with a weaker signal from the tag.

In some embodiments, the EAS manager 115 compares the signal strength of a first, unknown RFID tag with a second tag with a known location to determine the range. For example, if the first tag's signal is stronger than the second tag, where the second tag has a determined range of 20 feet, then the EAS manager 115 can estimate that the first tag is closer than 20 feet. The EAS manager 115 can use additional known tags to refine the estimate. For example, if the first tag is weaker than a third tag with a determined range of 10 feet, the EAS manager 115 can refine the estimate to within 10-20 feet. A fourth, fifth, or even more known tags can be used to further refine the estimate.

Other methods can include incrementally varying the power from the RFID reader to an antenna and determining the range based on where the readings from the tag drop out or diminish below a specified signal strength. For example, if half power from the reader corresponds to a detection range of 20 feet, while full power corresponds to a range of 30 feet, the tag signal dropping out at half-power indicates the tag is between 20-30 feet from the reader.

In some embodiments, the distance between the EAS gate and the tag can be calculated using phase ranging. For example, phase readings can be collected by monitoring reply signals from the RFID tags corresponding to interrogation signals at multiple frequencies and a common interrogation signal beam direction. The measured phase and frequency data can be compared with theoretical phases calculated with respect to the same frequencies over a range of positions corresponding to a beam extent of the interrogation signal in order to determine the distance.

In block 1120, the EAS manager 115 determines the velocity of the EAS tag. Determining the velocity of the tag can include determining the position of the tag at various times. Based on the position of the tag at various times, the EAS manager 115 can calculate a velocity of the tag, which can include the speed and direction of travel of the tag.

Figure 12:
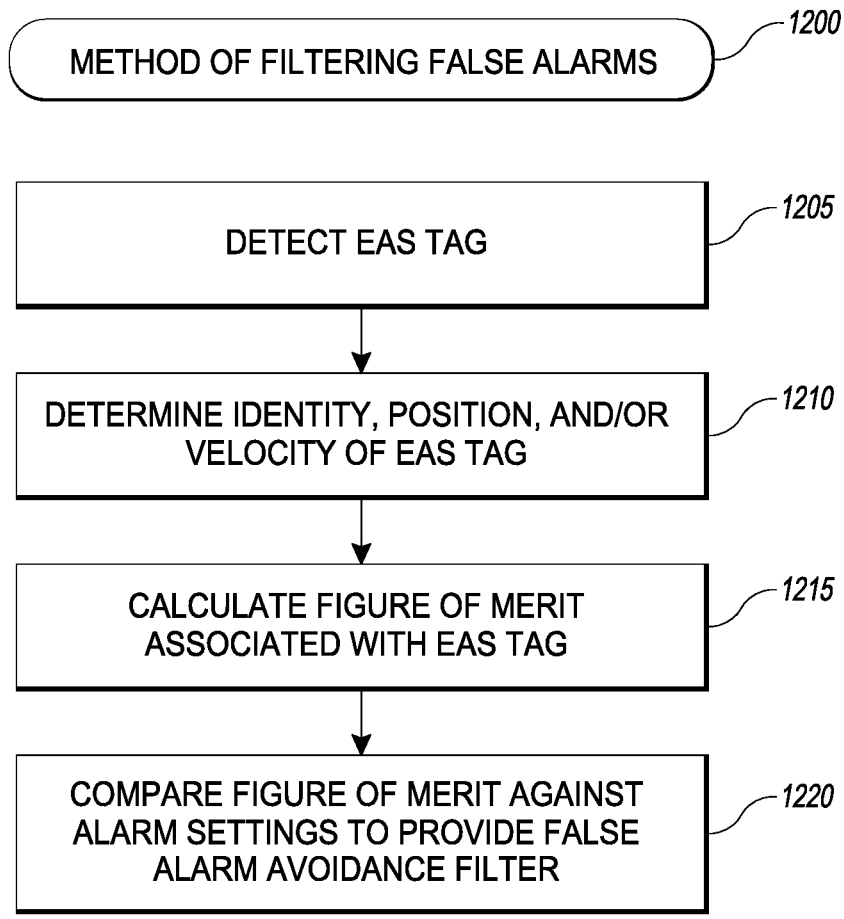
FIG. 12 shows a flow chart of some embodiments of a method for filtering against false alarms in an EAS system described herein with reference to FIGS. 1-4.

The identity, position, and velocity of the tag can be used to provide false alarm avoidance filters, as described herein with reference to FIG. 12. For example, the identity and position of the tag can be used to determine which items are being stored or displayed close to a guarded opening. As another example, the position and velocity of the tag can be used to distinguish between stationary items and items that are being taken through a protected opening.

Example False Alarm Avoidance Filtering Method

FIG. 12 shows a flow chart of some embodiments of a method 1200 for filtering against false alarms in an EAS system described herein with reference to FIGS. 1-4. For ease of description, the method 1200 will be described as being performed by an EAS manager 115. However, one or more steps in the method can be performed wholly or partially by other components of the EAS system, including a gate alarm controller 135, an RFID reader, an RFID data module 172, an antenna 140, or the like.

In block 1205, the EAS manager 115 detects the presence of an EAS tag in a monitored zone. Detecting the presence of the EAS tag can include interrogating the tag using one or more antennas in an EAS gate. When the tag is interrogated, a suitable RF signal is transmitted by the EAS gate and received by the tag. The tag generates a response, either through active or passive means, which is then detected by the EAS gate. This information can be passed to an RFID reader, such as the multi-port RFID reader 110 described herein with reference to FIGS. 1-4. In some embodiments, one or more EAS gates detect the tag and this information can be used to provide false alarm avoidance filtering capability.

In block 1210, the EAS manager 115 determines the identity, position, and/or velocity of the tag for each EAS gate which detected the tag. The EAS manager 115 can determine the identity, position, and velocity of the tag using the methods described herein with reference to FIG. 11.

In block 1215, the EAS manager 115 calculates a figure of merit associated with the tag. In some embodiments, the figure of merit is based on a degree of certainty as to whether the tag is approaching and/or passing through an opening or is simply close enough to an EAS gate to be read but is not being taken out. The degree of certainty can be determined based on the identity, position, and/or velocity of the tag. For example, the EAS manager 115 can identify the tag as a tag that is designated as a display item close to an exit. Furthermore, the EAS manager 115 can determine that the tag is located near the designated product display area. Finally, the EAS manager 115 can determine that the tag is stationary. Based on these determinations, the EAS manager 115 can assign a figure of merit to the tag. For example, where the figure of merit corresponds to a degree of certainty that the tag is leaving a restricted or monitored area, a high figure of merit can correspond to a tag that is in motion toward an exit and that is still activated. On the other hand, a low figure of merit can correspond to a tag that is stationary and located relatively far from an exit.

In block 1220, the EAS manager 115 can compare the determined figure of merit against alarm settings to provide false alarm avoidance filtering. In some embodiments, the EAS system assigns sensitivity settings for one or more EAS gates corresponding to a figure of merit calculation. Where the figure of merit corresponds to a certainty that an item is passing through a monitored zone, the sensitivity setting can be a number which indicates that alarms should be generated only items that have a figure of merit above the sensitivity limit. For example, a gate set to alarm when a figure of merit is greater than or equal to about 75% certainty is more sensitive than a gate which is set to alarm when the figure of merit is greater than or equal to about 90% certainty.

Example Method of Generating an Alarm

Figure 13:
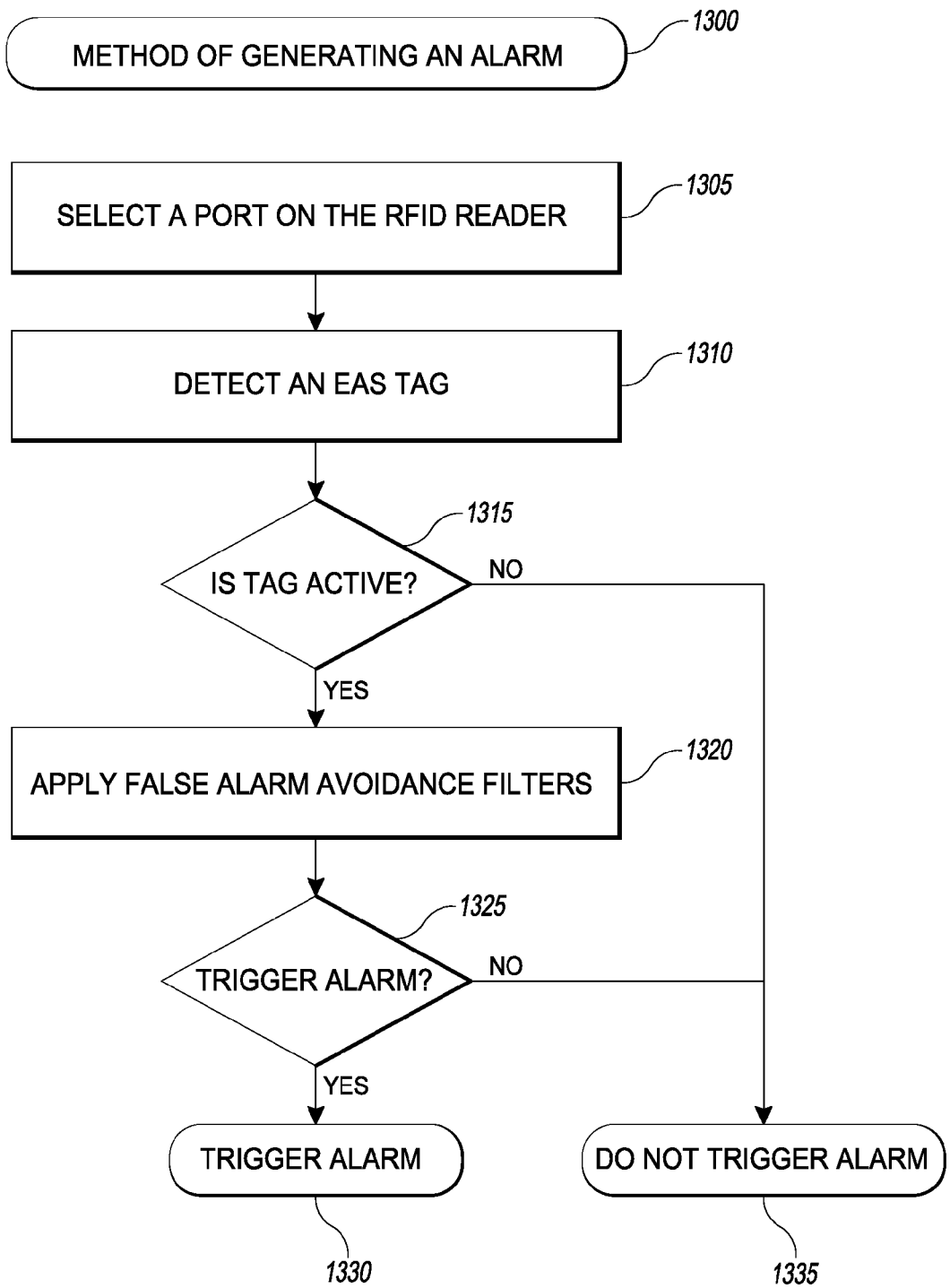
FIG. 13 shows a flow chart of some embodiments of a method for generating an alarm in an EAS system described herein with reference to FIGS. 1-4.

FIG. 13 shows a flow chart of some embodiments of a method 1300 for generating an alarm in an EAS system described herein with reference to FIGS. 1-4. For ease of description, the method 1300 will be described as being performed by an EAS manager 115. However, one or more steps in the method can be performed wholly or partially by other components of the EAS system, including a gate alarm controller 135, a multi-port RFID reader, an antenna 140, or the like.

In block 1305, the EAS manager 115 selects a port on the multi-port RFID reader 110. The port on the RFID reader 110 corresponds to an EAS gate. The EAS gate can correspond to a defined location or a defined monitored zone. The EAS manager 115 can send signals to and receive signals from the EAS gate through the use of the port on the RFID reader 110. In some embodiments, the EAS manager communicates with the EAS gate through the use of a DC block and coaxial cable, as described herein with reference to FIGS. 3 and 4. The EAS manager 115 can select each port in the RFID reader 110 corresponding to a coupled EAS gate in order to monitor a desired area.

In block 1310, the EAS manager 115 detects the presence of an EAS tag in a monitored zone. Detecting the presence of the EAS tag can include interrogating the tag using one or more antennas in an EAS gate. When the tag is interrogated, a suitable RF signal is transmitted by the EAS gate and received by the tag. The tag generates a response, either through active or passive means, which is then detected by the EAS gate. This information can be passed to the corresponding port on the RFID reader 110. In some embodiments, one or more EAS gates detect the tag and this information can be used to provide or enhance false alarm avoidance filtering capability, as described herein with reference to FIG. 12.

In block 1315, the EAS manager 115 determines whether the tag is an active tag. The EAS manager 115 can read a TID, OID, EAS bit, or other information from the tag to determine whether it is active. In some embodiments, the EAS manager 115 compares the tag information to point-of-sale information to see if the item has been sold. In some embodiments, the EAS manager 115 compares the tag information to information stored in a store management system. In some embodiments, the EAS manager 115 compares the tag information to information stored in the EAS manager 115. Determining the active status of the tag can include analyzing the TID, OID, and/or EAS bit of the tag. In some embodiments, a deactivated tag will have that information encoded in the OID of the tag. In some embodiments, a deactivated tag will have the EAS bit reflect that it is deactivated. In some embodiments, the TID of the tag will be on a list of deactivated tags. In some embodiments, the tag can respond to interrogation with a code that indicates that it is not active. As a result, the EAS manager 115 can determine the active status of the detected tag. If the tag has been deactivated, the method proceeds to block 1035 and no alarm will be triggered.

In block 1320, the EAS manager 115 applies false alarm avoidance filters. As described herein with reference to FIG. 12, false alarm avoidance filters can utilize the detected tag's identity, position, and/or velocity to determine a figure of merit for the detected tag. In some embodiments, the figure of merit corresponds to a degree of certainty that the detected tag is leaving a restricted area.

In block 1325, the EAS manager 115 decides whether to trigger an alarm. The EAS manager 115 can compare the figure of merit of the detected tag against sensitivity settings for the corresponding EAS gate. If the figure of merit is within a defined range, the EAS manager can decide to trigger the alarm in block 1330. If the figure of merit is not within the defined range, the EAS manager can decide not to trigger the alarm in block 1335. Other factors can be considered when deciding to trigger an alarm. For example, the EAS system can be put into a mode where all tags detected trigger an alarm regardless of false alarm avoidance filters or deactivation status. As another example, the EAS manager 115 can decide to trigger an alarm where a particular item or a particular category of items (e.g., small, expensive items) is on a designated watch list and that item is detected. As another example, the EAS manager 115 can trigger an alarm where one or more input sensors at the EAS gate detect a person moving toward an exit in conjunction with detecting the RFID tag with the RFID system.

Triggering an alarm in block 1330 can correspond to triggering a global or store-wide alarm or a local alarm. A local alarm can be localized to one or more EAS gates corresponding to the gates that detected the triggering EAS tag. A global or store-wide alarm can be based on a detected tag or other condition and can include sending e-mail or text message alerts to defined personnel. Triggering a local alarm at an EAS gate can include sending an alarm signal through a DC block coupled to an RFID reader over a coaxial cable coupling a centralized reader and control system to the EAS gate to a gate alarm controller coupled to a corresponding DC block at the EAS gate. The gate alarm controller can receive the alarm signal and trigger a visual and/or audible alarm using an I/O module. In some embodiments, the alarm controller can send a signal to a security camera through the I/O module when an alarm is triggered to cause the security camera to capture video of the surrounding monitored gate.

In some embodiments, triggering an alarm includes creating an emulated EAS signal which can be detected by another (usually pre-existing) EAS system. For example, the EAS manager can send an alarm signal to an appropriate EAS gate. A gate alarm controller at the EAS gate can receive the signal send an emulated EAS signal to another EAS gate system through an EAS emulation module. The other EAS gate system can then proceed to perform as it would have had it originally detected the triggering tag. For example, the other EAS gate system can trigger an audible and/or visual alarm.

In some embodiments, the EAS manager 115 can detect the presence of one or more security personnel near a gate triggering an alarm. For example, security personnel can have RFID tags on their clothing, equipment, and or body that allow the EAS manager 115 to identify the personnel and their location. The EAS manager 115 can notify the security personnel, such as through a radio module at the EAS gate, that an alarm has been triggered. The EAS manager 115 can be configured to detect the presence of security equipment near the alarming EAS gate. In some embodiments, the EAS manager 115 can send alarm information to the security equipment to aid in the prevention of loss. For example, the EAS manager 115 can detect the presence of a security wand in the vicinity of an alarming EAS gate based on an RFID tag associated with the wand. The EAS manager can send a list of tags triggering an alarm at the EAS gate to the security wand through a radio module at the EAS gate. In some embodiments, the radio module communicates this information over an unlicensed frequency using a proprietary protocol. For example, the radio module can send RF signals having a frequency of between about 430 MHz and about 435 MHz to the security wand. Upon receiving the signal from the EAS gate, the security wand can enter a specialized mode configured to detect the triggering tags. For example, the security wand can enter a "Geiger counter" mode which allows security personnel to locate the tags based on feedback from the security wand.

Example Use of Specialty Tags with the EAS System

Figure 14:
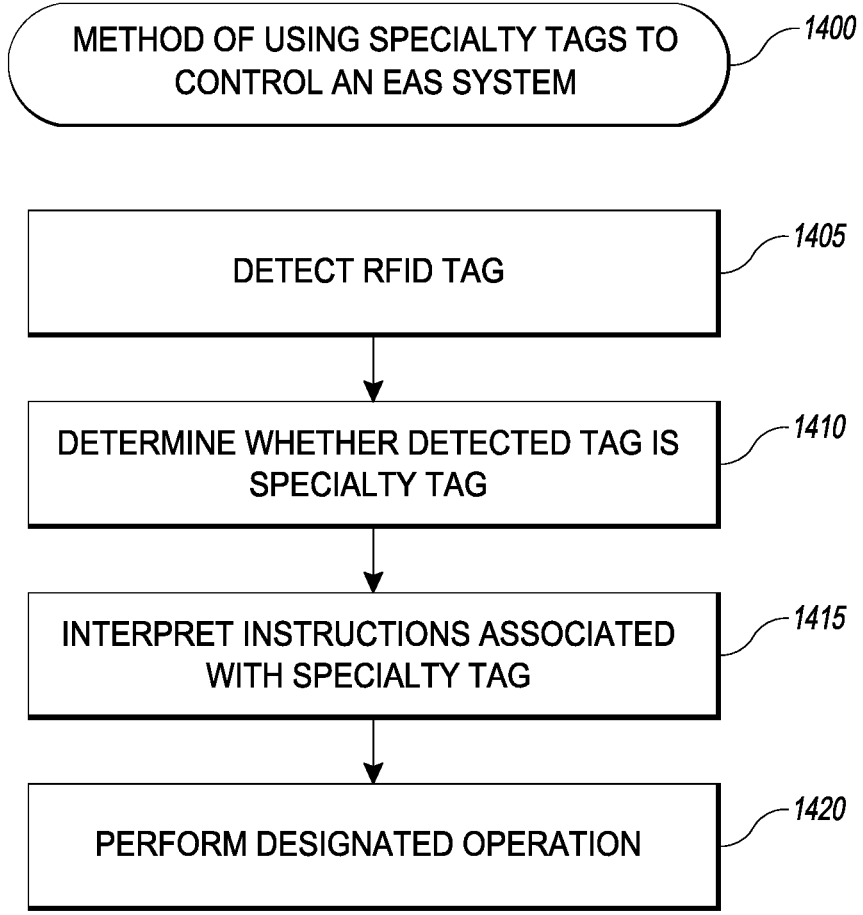
FIG. 14 shows a flow chart of some embodiments of a method for using specialty tags to control an EAS system described herein with reference to FIGS. 1-4.

FIG. 14 shows a flow chart of some embodiments of a method 1400 for using specialty tags to control an EAS system described herein with reference to FIGS. 1-4. For ease of description, the method 1400 will be described as being performed by an EAS system. However, one or more steps in the method can be performed wholly or partially by several components of the EAS system, including an EAS manager 115, a gate alarm controller 135, an RFID reader, an RFID data module 172, an antenna 140, or the like.

In block 1405, the EAS system detects the presence of a specialty tag with one or more EAS gates. Detecting the presence of the specialty tag can include interrogating the tag using one or more antennas in an EAS gate. When the tag is interrogated, a suitable RF signal is transmitted by the EAS gate and received by the tag. The tag generates a response, either through active or passive means, which is then detected by the EAS gate. This information can be passed to an RFID reader, such as the multi-port RFID reader 110 described herein with reference to FIGS. 1, 3, and 4.

In block 1410, the EAS system determines whether the tag is a specialty tag. In some embodiments, the specialty tag is a passive RFID tag that responds to interrogation with a designated code that identifies itself. In some embodiments, the specialty tag is a tag having encrypted and protected information thereon. In some embodiments, the specialty tag contains instructions incorporated into the tag information.

In block 1415, the EAS system interprets the instructions associated with the specialty tag. In some embodiments, interpreting the instructions can include comparing an instruction code to a list of defined operations. The EAS system can maintain an updatable list of instructions on a centralized reader and control system. In some embodiments, the instructions are hardcoded onto the tag itself. The EAS system can extract the instructions from the tag and perform the operation.

In block 1420, the EAS system performs the designated operation. In some embodiments, specialty tags can be used to turn the EAS system on and off. In some embodiments, a first specialty tag can be used to turn the system on and second specialty tag can be used to turn the system off. In some embodiments, specialty tags can be used to define locations within a store, such as where a door opening is located and where storage racks are located. These locations can be used to filter alarms to avoid false alarms. In some embodiments, specialty tags can be used to set sensitivity settings for EAS gates. Other examples of designated operations include, without limitation, setting door definitions, setting sensitivity and filtering options, setting visual and audible alarm options, turning on or off auxiliary functions (e.g., people counters, cameras, etc.), setting monitoring options, setting sensor interlock options (e.g., only alarm if sensor detects a person moving out the door in conjunction with detecting a tag), and other such operations.

In some embodiments, the specialty tag functionality can be emulated using a control device that mimics an EAS tag having varying IDs or user data. An operator can use the control device in range of an EAS gate and use the interrogation field of the antennas as the control channel of the device. The operator can mimic the specialty tags in the interrogation field using user interface controls on the control device. As a result, the operator can control the EAS system using the control device.

Conclusion

Many variations on the EAS system described above are possible. For example, while the above description generally describes functions as performed by the EAS manager 115, at least some of those functions can be performed by the alarm controller 135 or other components of the EAS system Likewise, at least some functions described as performed by the EAS system can be performed by the EAS gates. For example, the EAS gates may be configured to determine and apply false alarm avoidance filters.

As described above, the EAS system can be implemented with one or more physical servers or computing machines, such as several computing machines interconnected via a network. Thus, each of the components depicted in the EAS system can include hardware and/or software for performing various features.

The processing of the various components of the EAS system can be distributed across multiple machines, networks, and other computing resources. Moreover, in some embodiments the connections between the components shown represent possible paths of data flow, rather than actual connections between hardware. While some examples of possible connections are shown, any of the subset of the components shown can communicate with any other subset of components in various implementations. In some embodiments, an EAS system of a type as disclosed herein can be combined in a system of one or more other types of RFID readers, such as hand-held readers, robotic floor-roving readers, stationary readers (e.g., ceiling-mounted or other elevated readers), etc. A central processor and/or database can combine RFID inventory and EAS data from multiple sources for analysis or display.

In some embodiments, the EAS system may be configured differently than illustrated in the figures above. For example, various functionalities provided by the illustrated modules can be combined, rearranged, added, or deleted. In some embodiments, additional or different processors or modules may perform some or all of the functionalities described with reference to the example embodiment illustrated in the figures above. Many implementation variations are possible.

In some embodiments, a server computing system that has components including a central processing unit (CPU), input/output (I/O) components, storage, and memory may be used to execute the EAS manager 115, the gate alarm controller 135, or specific components of the EAS system. The executable code modules of EAS system can be stored in the memory of the server and/or on other types of non-transitory computer-readable storage media. In some embodiments, the EAS system may be configured differently than described above.

Each of the processes, methods, and algorithms described in the preceding sections may be embodied in, and fully or partially automated by, code modules executed by one or more computers, computer processors, or machines configured to execute computer instructions. The code modules may be stored on any type of non-transitory computer-readable medium or tangible computer storage device, such as hard drives, solid state memory, optical disc, and/or the like. The systems and modules may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. For example, embodiments have been described in the context of electronic article surveillance, but any of the structures, processes, and/or systems can be used singly or together in other contexts, such as in other systems for gathering or disseminating other types of information. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, is not generally intended to imply that features, elements and/or steps are required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

The following is claimed:

1. A method of operating an electronic article surveillance (EAS) system configured to detect radio frequency identification ("RFID") tags and transmit an EAS tag signal, the method comprising:
   interrogating, by an RFID reader, an RFID tag via one or more RFID antennas and according to an RFID protocol to receive a first set of information;
   in response to receiving the first set of information:
      filtering, by an RFID circuit that includes the RFID reader, the first information to generate filtered information based on the first information;
      generating, by an EAS conversion circuit coupled to the RFID reader, an EAS tag signal having the filtered information and containing less than all of the first information;
      wirelessly transmitting, by an EAS communication circuit coupled to the EAS conversion circuit, the generated EAS tag signal using the one or more EAS antennas and according to an EAS protocol, wherein the EAS protocol is different than the RFID protocol.

2. The method of claim 1, further comprising receiving the EAS tag signal at one or more EAS antennas, wherein the EAS antennas are distinct from the RFID antennas.

3. The method of claim 1, wherein the filtered information indicates presence of an non-deactivated tag.

4. The method of claim 1, further comprising supplying the first set of information to an external reporting system distinct from the EAS system.

5. The method of claim 1, wherein the interrogating an RFID tag comprises interrogating a passive RFID tag.

6. The method of claim 1, further comprising determining a location of a first RFID tag based on RFID signals received at multiple RFID antennas.

7. The method of claim 1, further comprising computing velocity of a first RFID based on RFID signals received at the one or more RFID antennas.

8. The method of claim 1, further comprising determining an identity of an item based on the first set of information.

9. The method of claim 1, further comprising, prior to the transmitting, determining whether to trigger an alarm based on the first set of information.

10. The method of claim 1, further comprising receiving a signal from a legacy EAS system indicating that an alarm has been triggered, and in response thereto, notifying an external reporting system.

11. An electronic article surveillance (EAS) system configured to detect radio frequency identification ("RFID") tags and transmit an EAS tag signal, the system comprising:
   one or more RFID antennas configured to transmit and receive RFID signals according to an RFID protocol;
   one or more EAS antennas configured to transmit according to an EAS protocol, wherein the EAS protocol is different than the RFID protocol;
   an RFID circuit operatively connected to the one or more RFID antennas, the RFID circuit comprising an RFID reader configured to interrogate RFID tags using the RFID protocol, the RFID circuit configured to:
      receive first information about a first interrogated RFID tag;
      in response to receiving the first information, filter the first information to generate filtered information based on the first information;
   an EAS conversion circuit coupled to the RFID reader, the EAS conversion circuit configured to generate an EAS tag signal having the filtered information and containing less than all the first information;
   an EAS communication circuit coupled to the EAS conversion circuit, the EAS communication circuit configured to wirelessly transmit the generated EAS tag signal using the one or more EAS antennas and according to the EAS protocol.

12. The EAS system of claim 11:
   wherein the EAS system is configured to monitor, via the one or more EAS antennas, for EAS alarm signals according to the EAS protocol;
   wherein the EAS system is configured to notify an external reporting system in response to detection of an EAS alarm signal.

13. The EAS system of claim 11 further comprising a legacy EAS system, the legacy EAS system:
   operative to wirelessly communicate using the EAS protocol, but not the RFID protocol;
   operative to receive the EAS tag signal from the one or more EAS antennas.

14. The EAS system of claim 13, wherein the RFID circuit is configured to wirelessly monitor an alarm status of the legacy EAS system.

15. The EAS system of claim 11, wherein the EAS system is disposed between first and second EAS gates of a legacy EAS system, with the legacy EAS system being operational.

16. The EAS system of claim 11, wherein:
   the RFID reader comprises a multi-port RFID reader;
   the one or more RFID antennas comprises a plurality of RFID antennas.

\* \* \* \* \*